(12) United States Patent
Saito et al.

(10) Patent No.: US 7,452,138 B2
(45) Date of Patent: Nov. 18, 2008

(54) OPTICAL CONNECTOR

(75) Inventors: Daigo Saito, Sakura (JP); Kazuhiro Takizawa, Sakura (JP); Hiroshi Furukawa, Sakura (JP); Kenichi Nakazawa, Tsukuba (JP); Tsunetaka Ema, Tsukuba (JP); Kouji Shibata, Tsukuba (JP)

(73) Assignees: Fujikura Ltd., Tokyo (JP); Nippon Telegraph & Telephone Corp., Tokyo (JP)

( * ) Notice: Subject to any disclaimer, the term of this patent is extended or adjusted under 35 U.S.C. 154(b) by 0 days.

(21) Appl. No.: 11/527,564

(22) Filed: Sep. 27, 2006

(65) Prior Publication Data
US 2008/0075407 A1    Mar. 27, 2008

(51) Int. Cl.
G02B 6/36    (2006.01)
(52) U.S. Cl. ........................................ 385/86
(58) Field of Classification Search ................ 385/86
See application file for complete search history.

(56) References Cited

U.S. PATENT DOCUMENTS

| | | | |
|---|---|---|---|
| 6,498,768 B1* | 12/2002 | Gjestrum et al. | 367/20 |
| 6,511,231 B2* | 1/2003 | Lampert et al. | 385/70 |
| 7,184,365 B2* | 2/2007 | George et al. | 367/20 |
| 7,347,627 B2* | 3/2008 | Saito et al. | 385/60 |
| 2004/0057691 A1* | 3/2004 | Doss et al. | 385/134 |
| 2006/0251374 A1* | 11/2006 | Chou et al. | 385/136 |
| 2007/0151390 A1* | 7/2007 | Blumenkranz et al. | 74/490.06 |
| 2007/0211997 A1* | 9/2007 | Saito et al. | 385/60 |

FOREIGN PATENT DOCUMENTS

| | | |
|---|---|---|
| JP | 10-206688 A | 8/1998 |
| JP | 11-64683 A | 3/1999 |
| JP | 2004-038023 A | 2/2004 |
| JP | 2005-114770 A | 4/2005 |
| JP | 2005-189589 A | 7/2005 |
| JP | 2005-189609 A | 7/2005 |

* cited by examiner

*Primary Examiner*—Ellen Kim
(74) *Attorney, Agent, or Firm*—Sughrue Mion, PLLC

(57) ABSTRACT

An optical connector includes a connector body that has a first optical fiber housed in advance in a ferrule so as to project from a back end of the ferrule opposite to the connecting end surface and an anchoring fixture that anchors a second optical fiber that is to be optically connected to the first optical fiber, and by pressing the anchoring fixture into the connector body while the second optical fiber is anchored in this anchoring fixture, the anchoring fixture and the connector body are connected to optically connect the first optical fiber and the second optical fiber, and the connecting portion that connects the anchoring fixture and the connector body form a movable connecting portion that is adapted to vary the direction of the anchoring fixture with respect to the connector body.

15 Claims, 17 Drawing Sheets

OPTICAL CONNECTOR

BACKGROUND OF THE INVENTION

1. Field of the invention

The present invention relates to an optical connector used in the connection of optical fibers, and in particular, to an optical connector that can be attached to the distal end portion of an optical fiber at a connection site or the like.

2. Description of Related Art

Conventionally, an on-site installable optical connector has been proposed that enables the connectable termination of an optical fiber at a connection site other than a factory (for example, Japanese Unexamined Patent Application, First Publication No. H10-206688), and various types of on-site installable optical connectors have been conceived according to this proposal. Note that an on-site installable optical connector is a type of optical connector in which the ferrule polishing operation following connection is omitted by inserting and fastening an optical fiber into a ferrule whose distal end has been polished in advance. The operation in which the optical connector is attached to the distal end portion of an optical fiber that is not on-site installable includes the steps of inserting the optical fiber (optical fiber cord or the like) in advance into all connector housing parts such as a rubber boot, polishing the distal end of the ferrule after the distal end of the optical fiber (for example, the bare optical fiber that has been exposed by removing the resin coat on the distal end of the optical fiber cord) is inserted into the ferrule, and then completing the assembly of the optical connector as a whole.

Recently, accompanying the progress in the spread of optical fiber networks, there has been a demand for enabling installation after attaching an optical connector to the distal end portion of an optical drop cable and an optical indoor cable. However, when a conventional on-site installable optical connector is used on these optical cables, the outer cover of the distal end portion of the optical cable is simply removed to expose the coated optical fiber, and then the on-site installable optical connector is attached to the distal end portion of this coated optical fiber. Covering the outer cover with a rubber boot is difficult, and assuming this has been carried out, it would be difficult to consider this to be easy to handle.

SUMMARY OF THE INVENTION

In consideration of the problems described above, the present invention has the object of providing an optical connector that can be installed on a distal end portion of an optical fiber cable such as an optical drop cable or an optical indoor cable.

In order to solve the problems described above, the present invention provides a connector body that has a first optical fiber that is housed in advance in a ferrule so as to project from the back end of the ferrule opposite the connecting end surface and an anchoring fixture that has an anchoring groove that anchors a portion of the first optical fiber that projects from the back end of the ferrule to a second optical fiber that is to be optically connected, and is releasably connectable to the connector body. The anchoring fixture accommodates the second optical fiber in the anchoring groove by fitting a portion of the second optical fiber that is covered by an outer cover into the insertion opening of the anchoring groove, and is configured such that the first optical fiber and the second optical fiber are optically connected after the anchoring fixture and the connector body are connected by pressing the anchoring fixture into the connector body while the second optical fiber is anchored in the anchoring fixture. The connecting portion that connects the anchoring fixture and the connector body forms a movable connecting portion that is adapted to vary the direction of the anchoring fixture with respect to the connector body while both are connected together.

According to a first aspect of the present invention, by accommodating a portion of an optical fiber cable such as an optical drop cable or an optical indoor cable that is covered by an outer cover into the anchoring groove of the anchoring fixture, the operation in which the optical fiber cable is optically connected to the first optical fiber, which is housed in the ferrule of the connector body, is extremely easy. Thereby, the optical connector of the present invention can be attached to the distal end portion of an optical fiber cable at a connection site.

Furthermore, the connection portion that connects the anchoring fixture and the connector body may form a movable connecting portion in which the direction of the anchoring fixture varies relative to the connector body while both are connected together, and thus the movable connecting portion moves flexibly according to the bending of the optical fiber that has been drawn out of the back of the anchoring portion, and a flexibility is obtained such that the bending stress is not concentrated locally in the optical fiber. Therefore, an optical connector having superior handling characteristics is obtained.

In the optical connector of the present invention, a movable connecting portion may be formed by connecting a spherical portion formed on the connecting portion that projects on the back end side of the connector body and an engaging portion that is provided on the connecting portion that projects on the distal end side of the anchoring fixture and is engageable with the spherical portion.

In addition, in the optical connector of the present invention, it is also possible to form, in the movable connecting portion, a pivot axis by connecting an axle provided on the connecting portion that projects on the back end side of the connector body and a bearing that is provided on the anchoring fixture and is engageable with the axle. In this optical connector, when the second optical fiber is flat in cross-section, a movable connecting portion is preferably provided such that the direction of the rotation around the axis is in the thickness direction of the second optical fiber.

According to a second aspect of the invention, a movable connecting portion is formed in which the anchoring fixture and the connector body are connected by spherical bearing and thereby it is possible to change the relative direction of the anchoring fixture in an arbitrary direction around the direction of the extension of the optical fiber in the connector body. Thus, the degree of freedom of the direction of the anchoring fixture relative to the connector body becomes higher.

According to a third aspect of the invention, it is possible to realize a change in the direction of the anchoring fixture as rotation around an axis. In particular, in the case in which the second optical fiber is flat in cross-section, according to a fourth aspect of the invention, it is possible to follow smoothly the bending of the second optical fiber in the thickness direction.

In order to solve the problems described above, the present invention provides a connector body that has a first optical fiber that is housed in advance in a ferrule so as to project from the back end of the ferrule opposite the connecting end surface and an anchoring fixture that has an anchoring groove that anchors a portion of the first optical fiber that projects from the back end of the ferrule to a second optical fiber that is to be optically connected, and can be releasably connected to the connector body. The anchoring fixture accommodates the second optical fiber in the anchoring groove by fitting a portion of the second optical fiber that is covered by an outer cover into an insertion opening of the anchoring groove, and is configured such that the first optical fiber and the second optical fiber are optically connected after the anchoring fixture and the connector body are connected while the second optical fiber is anchored in the anchoring groove. A protecting portion prevents separation of the second optical fiber from the anchoring groove by closing the insertion opening of the anchoring groove while the anchoring fixture and the connector body are connected.

In this optical connector, the anchoring groove provides a wall portion that prevents the end portion of the outer cover of the second optical fiber from projecting to the distal end side of the anchoring fixture on the distal end side of the anchoring fixture, which is a side facing the connector body when mounted on the connector body. It is possible to use a structure that provides a notch in the wall portion through which a portion of the second optical fiber that has had the outer cover removed passes.

In the present invention, a structure may be used in which a clamping portion is provided for clamping and holding the abutted and connected state of a portion of the first optical fiber that projects from the back end of the ferrule and the second optical fiber on the back end facing the connecting end surface of the ferrule in which the first optical fiber is housed in advance. By connecting the anchoring fixture to the connector body while the second optical fiber is anchored in the anchoring groove, the distal end portion of the second optical fiber is inserted into the clamping portion, and the first optical fiber and the second optical fiber are abutted and connected inside the clamping portion.

In this case, a structure may also be used in which the anchoring groove is provided at a position where direction of the anchoring groove is different from the direction of the extension of the second optical fiber in the clamping portion and that guarantees a space in which the second optical fiber can bend between the clamping portion and the anchoring groove while the first optical fiber and the second optical fiber are abutted and connected in the clamping portion.

In addition, in the present invention, a structure may also be used in which the direction of the anchoring groove with respect to the connector body varies in several directions.

In addition, in the present invention, a structure can also be used in which the protecting portion is formed by a lid that is freely openable and closeable and integrally formed with the anchoring fixture, a pair of connecting portions are provided on a back end side of the connector body that connect the anchoring fixture to the connector body by sandwiching the anchoring fixture having the lid being closed from a lid side and an anchoring fixture side.

According to a fifth aspect of the present invention, by accommodating a portion of an optical fiber cable such as an optical drop cable or an optical indoor cable that is covered by an outer cover into the anchoring groove of the anchoring fixture, the operation in which the optical fiber cable is optically connected to the first optical fiber, which is housed in the ferrule of the connector body, is extremely easy. Thereby, the optical connector of the present invention can be attached to the distal end portion of an optical fiber cable at a connection site.

According to a sixth aspect of the present invention, it is possible to prevent the end portion of the outer cover from projecting to the distal end side of the anchoring fixture when the optical fiber cable is anchored in the anchoring groove. Thereby, the adjustment of the length of the distal end portion of the second optical fiber that has had the outer cover removed can be carried out more simply and reliably.

According to a seventh aspect of the present invention, the optical connection between both optical fibers can be more reliably maintained by the second optical fiber and the first optical fiber being clamped and held in the clamping portion.

According to an eighth aspect of the present invention, local bending of the second optical fiber when the second optical fiber and the first optical fiber are abutted can be avoided, and thereby forced bending does not occur in the second optical fiber. As a result, it is possible to suppress increases in the optical loss due to forced bending of the second optical fiber.

According to a ninth aspect of the present invention, it is possible to align the direction of the extension of the optical fiber cable depending, for example, on the environment in proximity to the optical fibers.

According to a tenth aspect of the present invention, separation of the optical fiber cable can be reliably prevented by not opening the lid while the connector body and the anchoring fixture are connected.

In order to solve the problems described above, the present invention provides a connector body that has a first optical fiber that is housed in advance in a ferrule so as to project from the back end of the ferrule opposite the connecting end surface, and an anchoring fixture that has an anchoring groove that anchors a portion of the first optical fiber that projects from the back end of the ferrule to a second optical fiber that is to be optically connected, and can be releasably connected to the connector body. The anchoring fixture accommodates the second optical fiber in the anchoring groove by fitting a portion of the second optical fiber that is covered by an outer cover into the insertion opening of the anchoring groove, and is configured such that the first optical fiber and the second optical fiber are optically connected after the anchoring fixture and the connector body are connected while the second optical fiber is anchored in the anchoring fixture. A sliding portion is provided on the connector body, where the sliding portion is adapted to vary an amount of projection of the sliding portion from the back end portion of the connector body along the insertion direction of the second optical fiber. The second optical fiber can be positioned with respect to, abutted against, and connected to the first optical fiber by abutting an abutting portion of the anchoring fixture against the sliding portion and pressing the sliding portion towards the connector body.

In this optical connector, it is possible to employ a structure in which the connector body has an abutting portion that abuts a sliding portion in the direction of the insertion of the second optical fiber.

In the present invention, the connector body can employ a structure having a connecting portion that is disposed at the retracted position that does not interfere with the movement of the anchoring fixture when the anchoring fixture abuts the sliding portion and is pressed towards the connector body, and is moveable to a connecting position that enables connection with the anchoring fixture by moving from the retracted position after the second optical fiber is abutted and connected to the first optical fiber.

In addition, the present invention can employ a structure wherein the sliding portion has a long plate shape, and a groove-shaped rail is provided on the connector body that slidably guides the sliding portion along the longitudinal direction thereof.

In addition, the present invention may employ a structure wherein the anchoring fixture has a groove-shaped engaging portion that is engageable with an end of the sliding portion that project from the connector body and that is opposite to the other end of the sliding portion that is inserted into the groove-shaped rail of the connector body.

According to an eleventh aspect of the present invention, by accommodating a portion of an optical fiber cable such as an optical drop cable or an optical indoor cable that is covered by an outer cover into the anchoring groove of the anchoring fixture, the operation in which the optical fiber cable is optically connected to the first optical fiber, which is housed in the ferrule of the optical connector, is extremely easy. Furthermore, it is possible for the sliding portion to guide the pressing of the anchoring fixture with respect to the connector body by making the sliding portion project from the back end portion of the connector body. Thereby, the optical connector of the present invention can be attached to the distal end of the optical fiber cable at a connection site or the like.

According to a twelfth aspect of the present invention, because one end of the sliding portion abuts the abutting portion, it is possible to prevent the sliding portion from moving farther than the distal end side of the housing body.

According to a thirteenth aspect of the present invention, it is possible to move the sliding portion along the longitudinal direction of the connector body, and at the same time, after connecting the anchoring fixture, the sliding portion can be compactly accommodated in the groove.

According to a fourteenth aspect of the present invention, because the anchoring fixture engages the sliding portion, unfavorable phenomenon such as unstableness of the anchoring fixture or separation of the anchoring fixture from the sliding portion when the anchoring fixture is pulled back can be prevented.

DETAILED DESCRIPTION OF THE INVENTION

Below, the preferred embodiments for implementing the present invention are explained with reference to the drawings.

FIG. 1 to FIG. 7 are drawings showing the optical connector in the first embodiment of the present invention.

Figure 1:
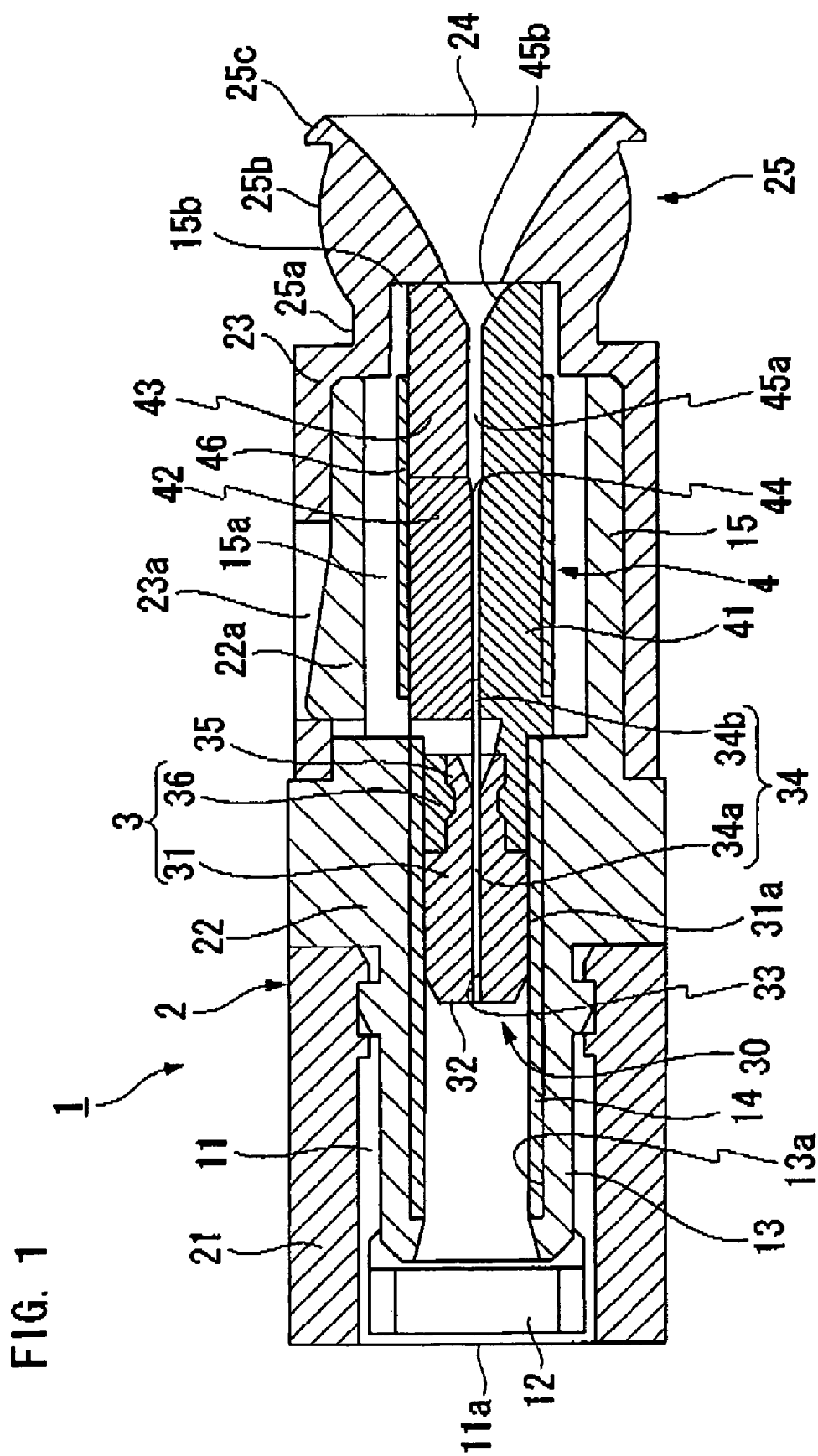
FIG. 1 is a longitudinal cross-sectional view showing the connector body in a first embodiment of the present invention.
Figure 2:
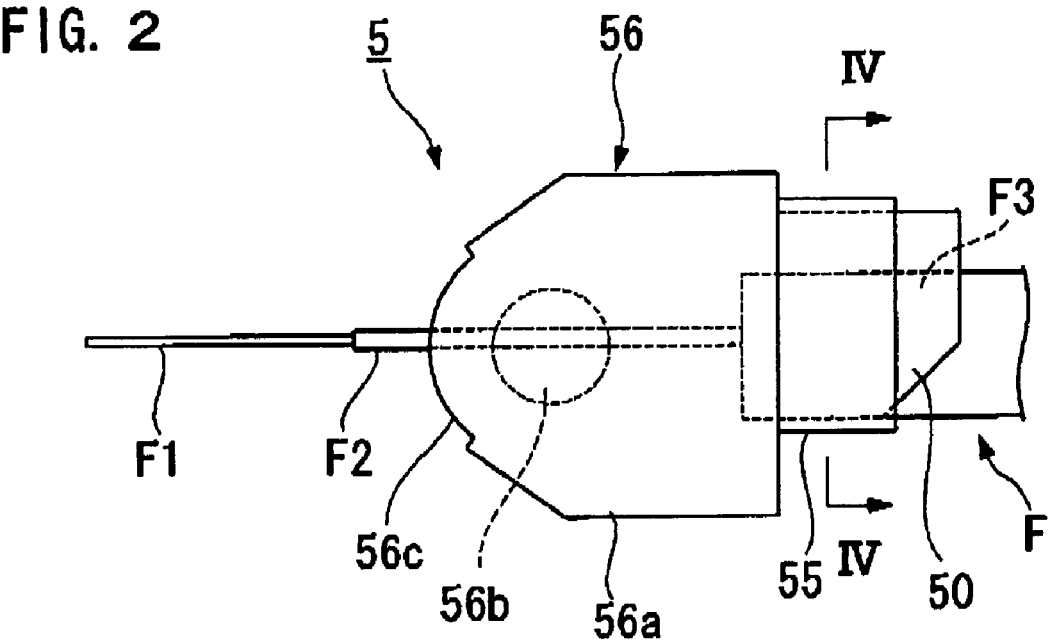
FIG. 2 is a frontal view showing the state in which the optical fiber cable and the protecting portion are installed in the anchoring fixture in the first embodiment of the present invention.
Figure 3:
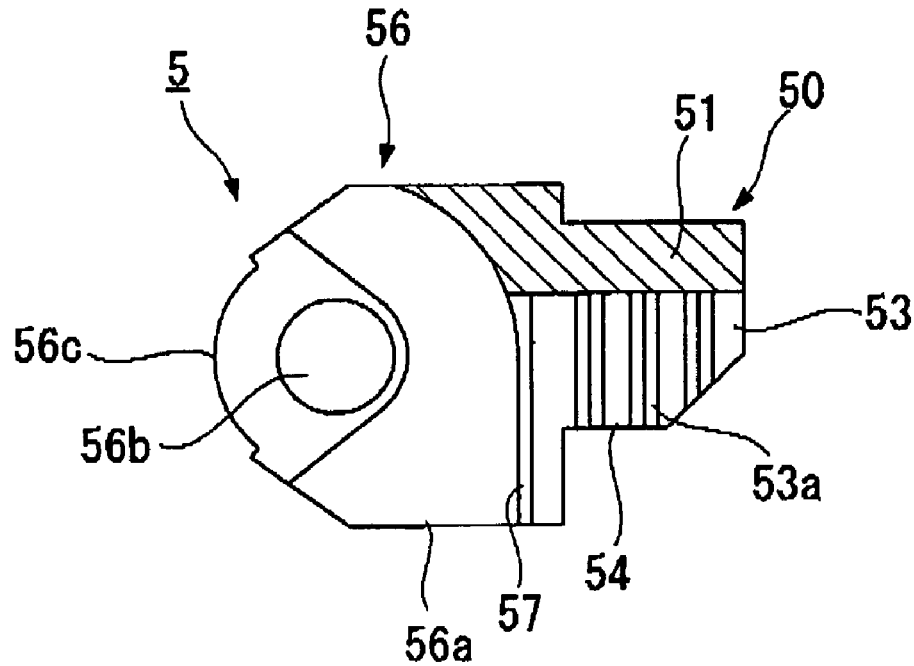
FIG. 3 is a longitudinal cross-sectional view showing the anchoring fixture in the first embodiment of the present invention.
Figure 4:
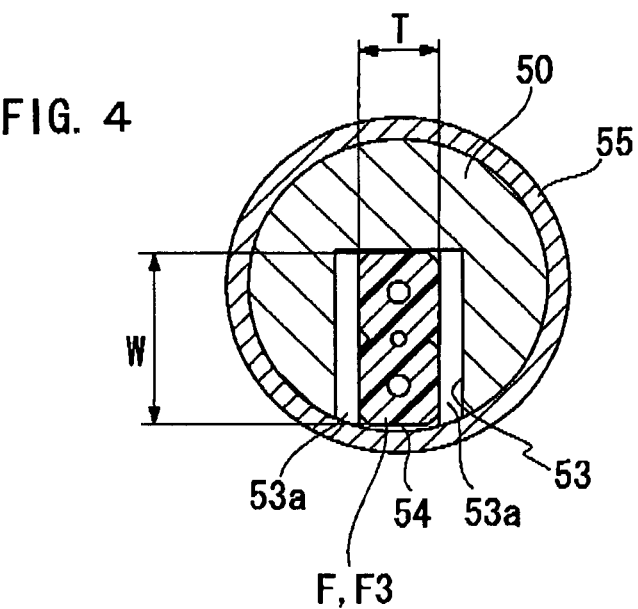
FIG. 4 is a cross-sectional drawing taken along the line IV-IV in FIG. 2.
Figure 5:
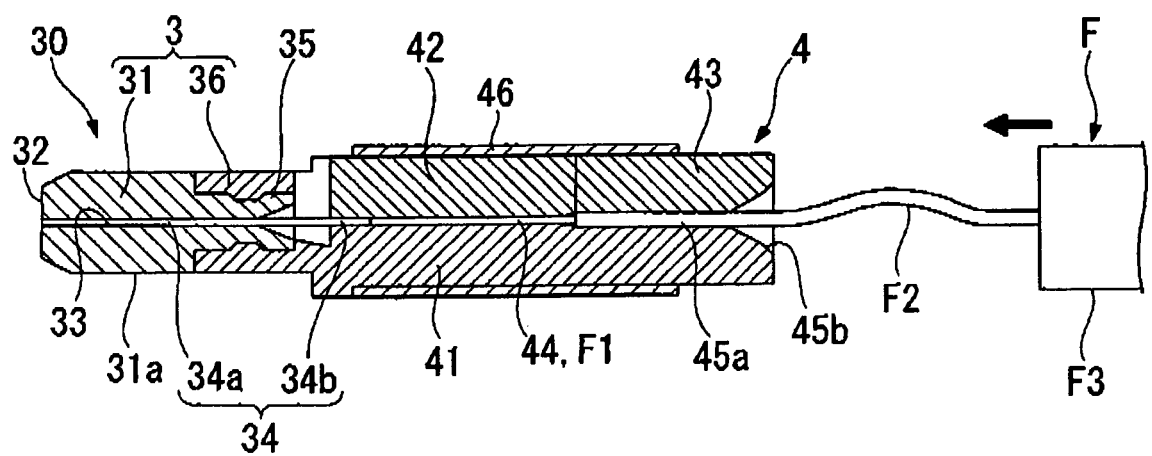
FIG. 5 is a cross-sectional drawing showing an example of the state in which a first optical fiber (a connection optical fiber) and a second optical fiber (another optical fiber) are butted inside the clamping portion.
Figure 6:
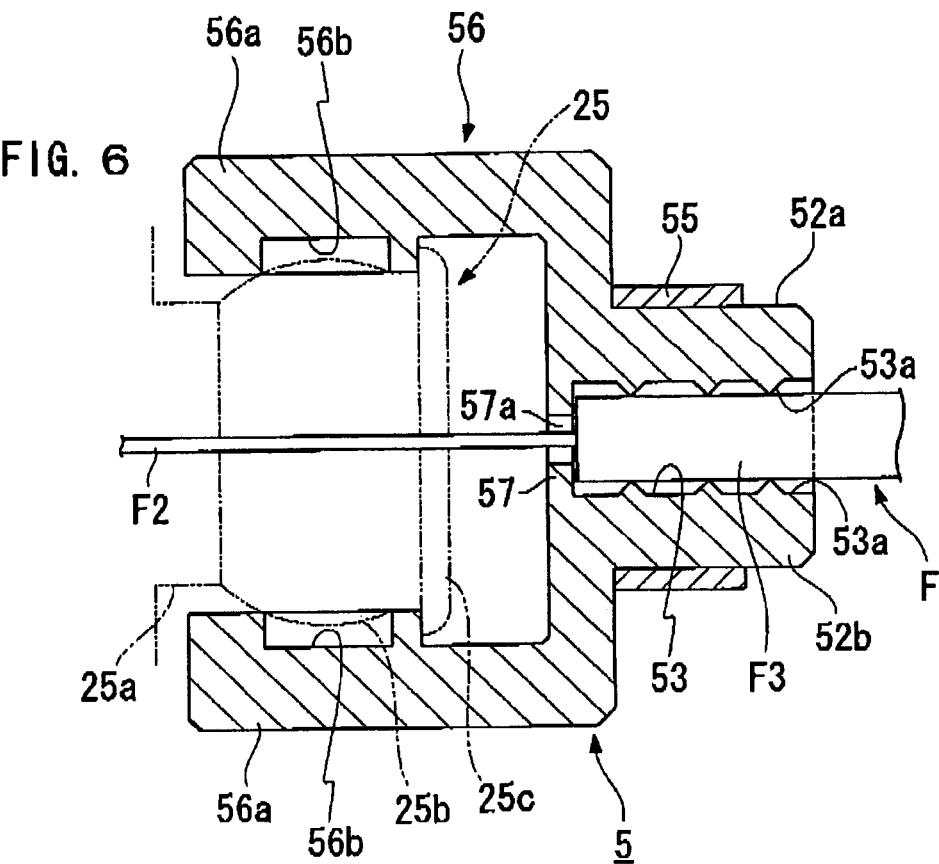
FIG. 6 is a schematic drawing showing the state in which the anchoring fixture is connected to the connector body in the first embodiment of the present invention.
Figure 7:
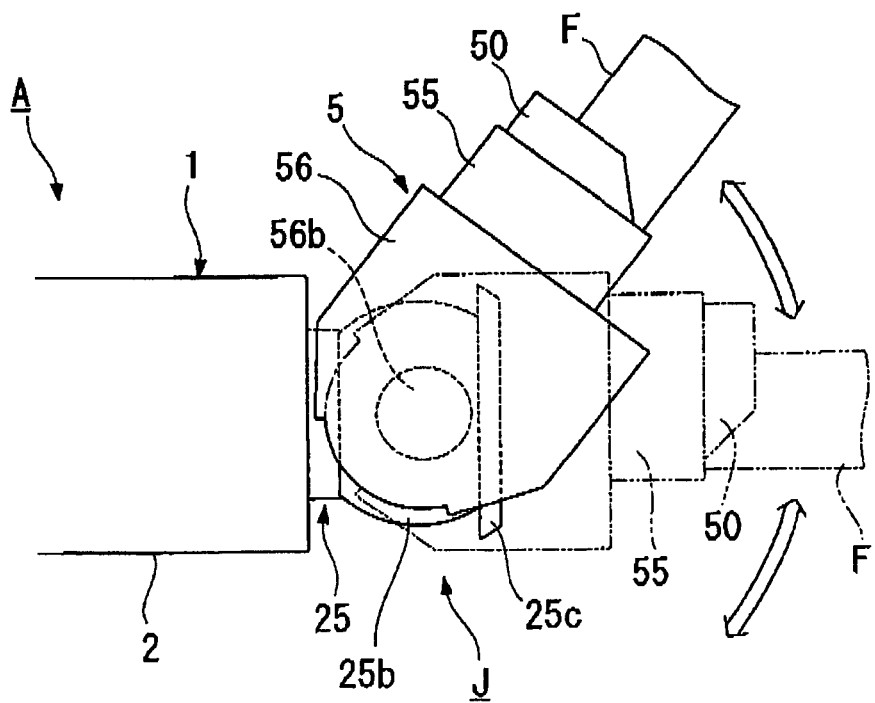
FIG. 7 is a schematic drawing that explains the direction of the anchoring fixture relative to the connector body in the first embodiment of the present invention.

FIG. 1 is a longitudinal cross-sectional view showing the connector body in a first embodiment of the present invention. FIG. 2 is a frontal view showing the state in which the optical fiber cable and the protecting portion are installed in the anchoring fixture. FIG. 3 is a longitudinal cross-sectional view showing the anchoring fixture. FIG. 4 is a cross-sectional drawing taken along the line IV-IV in FIG. 2. FIG. 5 is a cross-sectional drawing showing an example of the state in which a first optical fiber (a connection optical fiber) and a second optical fiber (another optical fiber) are abutted inside the clamping portion. FIG. 6 is a schematic drawing showing the state in which the anchoring fixture is connected to the connector body in a first embodiment of the present invention. FIG. 7 is a schematic drawing that explains the direction of the anchoring fixture relative to the connector body in a first embodiment of the present invention.

As shown in FIG. 1, FIG. 2, and FIG. 3, the optical connector A of the present embodiment includes a connector body 1 and an anchoring fixture 5. The connector body 1 has a first optical fiber 34 housed in advance in the ferrule 3 so as to project from the back end of the ferrule 3 opposite to the connecting end surface 32. The anchoring fixture 5 has an anchoring groove 53 that anchors the second optical fiber F optically connected to the portion 34b of the first optical fiber 34, which projects from the back end of the ferrule 3, and can be releasably connected to the connector body 1.

Here, an optical fiber cable (indoor cable, drop cable, or the like) is used for the second optical fiber F. In this optical fiber cable, an outer cover F3 covers the outside periphery of a coated optical fiber F2, which in turn includes a resin coat on the outside periphery of a bare optical fiber F1.

As shown in FIG. 4, here as the optical fiber cable F, an optical fiber cable having a flat cross-section is used, in which the thickness T thereof is smaller than the width W thereof. Note that the cross-sectional shape of the optical fiber cable F is not limited in particular to a flat shape, and, for example, a round shape or a rectangular shape can also be used.

As shown in FIG. 1, the connector body 1 provides a ferrule 3 in which the first optical fiber 34 is housed in advance; a clamping portion 4 that maintains the abutted and connected state between the portion 34b of the first optical fiber 34 that projects from the back end of the ferrule 3; and a housing 2 that accommodates the ferrule 3 and the clamping portion 4.

The clamping portion 4 is connected to the ferrule 3 so as to extend from the back end of the ferrule 3 that is opposite to the connecting end surface 32. Thereby, a clamping portion equipped ferrule 30, in which the ferrule 3 and the clamping portion 4 are integrated, is formed. The housing 2 has an optical connector accommodating hole 11 disposed opposite to the connecting end surface 32 of the ferrule 3, into which the optical connector (optical connector plug) that is to be connected is inserted and accommodated, and thus the housing 2 functions as an optical connector receptacle.

The ferrule 3 includes a ferrule distal end portion member 31 that has a small hole 33 inside and a ferrule base portion 36 that is connected to the end portion 35 on the side opposite to the connecting end surface 32 of the ferrule distal end portion member 31.

The ferrule distal end portion member 31 is formed by a ceramic such as zirconia or a hard material such as glass, formed into a substantially cylindrical shape, and the peripheral surface 31a of the ferrule distal end portion member 31 has a cylindrical surface. The material that is used for the ferrule distal end portion member 31 is one that is harder than the material of the ferrule base portion 36.

The center axis of the small hole 33 is precisely positioned with respect to the peripheral surface 31a of the ferrule distal end portion member 31. Thereby, as is well-known, when the end surfaces of optical fibers are abutted together by opposing the connection end surfaces of the ferrules of the two optical connectors, by mounting the split sleeve 14 on the periphery of both ferrules, it is possible to precisely position and align and thereby optically connect both optical fibers housed in the ferrule.

The connecting end surface 32 of the ferrule distal end portion member 31 may be polished after the first optical fiber 34 is inserted into the small hole 33. The first optical fiber 34 has a portion 34a that is housed in the ferrule 3 and a portion 34b that protrudes from the back end of the ferrule 3.

The ferrule base portion 36 is a portion interposed between the ferrule distal end portion member 31 and the clamping portion 4, and the peripheral surface thereof has a substantially cylindrical shape. The diameter (outer diameter) of the ferrule base portion 36 is slightly smaller than the diameter (outer diameter) of the ferrule distal end portion member 31. That is, the peripheral shape of the ferrule base portion 36 is smaller than the peripheral shape of the ferrule distal end portion member 31.

Thus, even if the dimensional accuracy of the ferrule base portion 36 is slightly low, the peripheral surface thereof protruding from the outer peripheral surface 31a of the ferrule distal end portion member 31 is avoided, and thus when the split sleeve 14 is mounted on the ferrule distal end portion member 31, the outer peripheral surface of the ferrule base portion 36 interfering with the split sleeve 14 can be suppressed. Therefore, it is possible to carry out the alignment of the optical fiber 34 with high accuracy.

The base portion 35 of the ferrule distal end portion member 31 is an extended portion (below, the base portion 35 may be referred to as an extended portion 35) whose outer peripheral shape is smaller than the outer peripheral shape of the ferrule distal end portion member 31.

The ferrule distal end portion member 31 and the ferrule base portion 36 are joined such that the outer peripheral surface of the extended portion 35 is covered by a portion of the ferrule base portion 36 and the extended portion 36 is embedded in the ferrule base portion 36.

An annular groove (reference numeral omitted) is formed on the outer peripheral surface of the extended portion 35 along the periphery of the extended portion 35. In this manner, because the peripheral surface of the extended portion 35 has an irregularity such as a groove, the resin that forms the ferrule base portion 36 solidifies into an irregular form, and thereby the connection strength is high.

As shown in FIG. 5, the clamping portion 4 includes the elements 41, 42, and 43, which have a half split structure, and the U-shaped spring member 46 that is mounted around these elements 41, 42, and 43, and the elements are clamped by being fit therein. Here, the elements 41, 42, and 43 include by a base body 41 and lid bodies 42 and 43, the lid bodies 42 and 43 being disposed so as to be arranged longitudinally opposite to this base body 41, and be integrated into a rectangular column shape by the clamping force of the spring member 46.

Note that the elements 41, 42, and 43 may also have a columnar shape (each of the half split elements having a hemispherical shape in cross-section), and in this case, the spring member 46 will have a C-shape.

The base body 41 and the ferrule base portion 36 are integrally molded using a synthetic resin, and thereby form an integrated member. The clamping portion equipped ferrule 30 is assembled by combining the lid bodies 42 and 43 on the base body 41 that is integrated with the ferrule 3 and clamping the base body 41 and the lid bodies 42 and 43 by a spring member 46. In this manner, in the optical connector body 1 of the present embodiment, because the base body 41 and the ferrule base portion 36 are integrally formed, the base body 41 is always stably supported at a home position with respect to the ferrule 3. Therefore, the stability of the optical connection between the optical fibers 34 and F in the clamping portion 4 can be increased.

A positioning groove 44 that positions and aligns the optical fibers 34 and F is formed on the facing surfaces where the base body 41 and the lid body 42 on the distal end side overlap to serve as an alignment mechanism. The positioning groove 44 extends in the longitudinal direction of the base body 41. There are several locations at which the positioning groove 44 may be formed. For example, a structure in which the positioning groove 44 is formed on the facing surface of the base body 41, a structure in which the positioning groove 44 is formed on the facing surface of the lid body 42 side, or a structure in which the positioning groove 44 is formed on both the base body 41 and the lid body 42 sides can be used. The cross-sectional shape of the positioning groove 44 may be, for example, a V-shaped groove, but a U-shaped groove or a round groove (a groove having a semi-circular cross-section) may be used. The positioning groove 44 may be provided for each optical fiber 34 and F pair to be connected (as many as the number of cores).

At the back end of the clamping portion 4, a tapered hole 45b is formed for inserting the coated optical fiber F2 into the clamping portion 4. The tapered hole 45b having a funnel shape is formed in the facing surfaces of the base body 41 and the back end side lid body 43.

Between the positioning groove 44 and the tapered hole 45b, an outer cover accommodating groove 45a is provided that communicates with the positioning groove 44 and the tapered hole 45b. This outer cover accommodating groove 45a is formed at a position exactly opposite to the facing surfaces where the base body 41 and the lid body 43 on the back end side overlap. The outer cover accommodating groove 45a accommodates the distal end portion of the coated optical fiber F2, and is shaped such that when the elements 41 and 43 is clamped by the spring member 46, the coated optical fiber F2 can be securely clamped and fastened.

Furthermore, although not specifically illustrated, a wedge insertion groove into which the wedge of a release member is inserted is formed on one edge portion of the facing surfaces where the base body 41 and the lid bodies 42 and 43 overlap. The clamping portion 4 is formed so that, by press fitting the wedge into the wedge insertion groove, the base body 41 and the lid bodies 42 and 43 can be pressed open by resisting the clamping force of the spring member 46. Then, when the wedge is removed from the wedge insertion groove, the base body 41 and the lid bodies 42 and 43 are closed and integrated again due to the clamping force of the spring member 46.

As shown in FIG. 1, the housing 2 is formed by a housing body 22 having a sleeve holder 13 that accommodates the ferrule 3 and a clamp accommodating portion 15 that accommodates the clamping portion 4; a front portion housing 21 attached to the side of the sleeve holder 13 of this housing body 22; and a back portion housing 23 that is installed on the side of the clamping portion accommodating portion 15 of the housing body 22.

The front portion housing 21 is formed in a sleeve shape, and by engaging the housing body 22, forms an optical connector accommodating hole 11 that opens in the distal end side (the left side in FIG. 1) of the connector body 1. Inside the optical connector accommodating hole 11, a pair of elastic engaging pieces 12 opposite each other project from the inside of the optical connector accommodating hole 11 towards the opening portion 11a. Between the pair of elastic engaging pieces 12, the sleeve holder 13 projects towards the opening portion 11a. The sleeve holder 13 has a ferrule accommodating hole 13a that communicates between the optical connector accommodating hole 11 and the clamping portion accommodating portion 15. The split sleeve 14 having a C-shape in cross-section is mounted inside the ferrule accommodating hole 13a of the sleeve holder 13.

This optical connector accommodating hole 11 accommodates the optical connector plug to be connected, which is disposed opposite to the connecting end surface 32 of the ferrule 3, firmly holds the optical connector plug by using the elastic engaging pieces 12, and can precisely position and align the optical fibers housed in the ferrule by the split sleeve 14. Therefore, it is possible to maintain an optically connected state between the optical fiber, which is terminated by the optical connector plug, and the first optical fiber 34, which is housed in the ferrule 3 of the optical connector of the present embodiment.

The clamping portion accommodating portion 15 has an inner space 15a inside which the clamping portion 4 is accommodated.

The inner space 15a of the clamping portion accommodating portion 15 opens (opening portion 15b) in the back end side, which is the side opposite to the side of the optical connector accommodating hole 11 (the right side in FIG. 1). By inserting the clamping portion equipped ferrule 30 from the opening portion 15a, the housing body 22 can accommodate the ferrule 3 inside the split sleeve 14 and the clamping portion 4 in the clamping portion accommodating portion 15.

An engaging catch 22a that can engage the engaging hole 23a formed in the back portion housing 23 is provided on the side portion of the clamping portion accommodating portion 15. The housing body 22 and the back portion housing 23 are releasably engaged by fitting the back portion housing 23 over the outer periphery of the clamping portion accommodating portion 15 and engaging the engaging catch 22a of the housing body 22 in the engaging hole 23a of the back portion housing 23. The separation of clamping portion 4, which has been accommodated in the clamping portion accommodating portion 15, is prevented from separating from the opening portion 15b by the back portion housing 23 engaged in the housing body 22.

The back portion housing 23 includes an optical fiber insertion hole 24 that communicates with the opening portion 15b of the clamping portion accommodating portion 15 while engaged in the housing body 22 and a connecting portion 25 for connecting the anchoring fixture 5 with the connector body 1.

The connecting portion 25 projects on the back end side of the back portion housing 23. As shown in FIG. 6, the connecting portion 25 includes a spherical portion 25b, whose outer surface has a spherical shape; a cylindrical portion 25a, whose peripheral surface has a cylindrical shape and is interposed between the back portion housing 23 and the spherical portion 25b; and an edge portion 25c, which projects in a rib shape on the end projecting from the back portion housing 23 of the connecting portion 25.

As shown in FIG. 1, the optical fiber insertion hole 24 has a tapering shape that expands towards the back end of the connecting portion 25. The diameter of the optical fiber insertion hole 24 decreases from the back end of the connecting portion 25 towards the tapered hole 45b of the clamping portion 4.

As shown in FIG. 2, FIG. 3, FIG. 4, and FIG. 6, the anchoring fixture 5 includes an anchoring portion 50 that anchors the optical fiber cable F and a connecting portion 56 that is provided on the distal end side of the anchoring portion 50 in order to connect the anchoring fixture 5 to the connecting portion 25 of the connector body 1.

As shown in FIG. 6, the connecting portion 56 of the anchoring fixture 5 includes a pair of projecting pieces 56a and 56b opposite each other and an engaging recess 56b (engaging portion) formed in the surface inside each of the engaging pieces 56a (the surface opposite to the corresponding projecting piece 56a).

The projecting piece 56a is provided on the distal end side, which is the side facing the optical connector 1 when the anchoring fixture 5 is mounted on the connector body 1. The edge portion 56c on the end of the projecting piece 56a that projects from the anchoring portion 50 is formed into an arc shape. The connecting portion 56 of the anchoring fixture 5 fits on the connecting portion 25 of the connector body 1 side at both projecting pieces 56a and 56a, and the engaging recess 56b of the projecting pieces 56a are engaged on the spherical portion 25b of the connecting portion 25 on the connector body 1 side, and thereby the anchoring fixture 5 is connected to the connector body 1. Specifically, as shown in FIG. 7, the connecting portion 25 on the connector body 1 side and the connecting portion 56 on the anchoring fixture 5 side form the movable connecting portion J, which connects the anchoring fixture 5 and the connector body 1 by a spherical bearing.

The anchoring portion 50 includes a bottom wall portion 51 and a pair of side wall portions 52a and 52b that are provided so as to oppose each other from both side edges of the bottom wall portion 51. A anchoring groove 53 having a U-shape in cross-section (opening downward in FIG. 3 and FIG. 4) is formed between the two side wall portions 52a and 52b extending in the longitudinal direction (left to right in FIG. 3) of the anchoring portion 50. The anchoring groove 53 is formed such that the direction in which both side wall portions 52a and 52a oppose each other is the direction of the thickness T of the optical fiber cable F. The opening portion that opens in this U-shaped groove serves as an insertion opening 54 for inserting the optical fiber cable F into the anchoring groove 53.

Bead-shaped projections 53a, which hold the optical fiber cable F by compressing the outer cover F3 of the optical fiber cable F, project in plurality on both sides of the inner surface of the anchoring groove 53. Thereby, by fitting a portion of the optical fiber cable F that is covered by the outer cover F3 into the anchoring groove 53, it is possible accommodate and fasten the optical fiber cable F in the anchoring groove 53. Preferably, the resistance to extraction of the optical fiber cable F due to the compression by the projections 53a is equal to or greater than 5 kgf.

As shown in FIG. 4, the outer peripheral surface of the anchoring portion 50 is substantially cylindrical. In the anchoring fixture 5, the insertion opening 54 of the anchoring groove 53 is closed by mounting the ring-shaped protecting portion 55 on the anchoring portion 50, and thereby the separation of the optical fiber cable F from the anchoring groove 53 is prevented.

As shown in FIG. 6, the anchoring groove 53 has a front end wall 57 that projects beyond both side wall portions 52a and 52b on the distal end side (the left side in FIG. 6) of the anchoring fixture 5, which is the side facing the connector body 1 when the mounted on the connector body 1. The side end wall 57 has a notch shaped gap 57a on the center portion of the anchoring groove 53 in the transverse direction (the direction orthogonal to the direction of the extension of the anchoring groove 53; the vertical direction in FIG. 6). The amount of the opening of the gap 57a of the front end wall 57 is sufficiently large to allow the insertion of the coated optical fiber F2, but allow not the insertion of the outer cover F3 of optical fiber cable F. When the optical fiber cable F is anchored in the anchoring groove 53, the end part of the outer cover F3 is prevented from projecting out to the distal end side of the anchoring fixture 5 by this front end wall 57.

Next, an example of the procedure for attaching the optical connector A of the present embodiment to the distal end portion of the optical fiber cable F will be explained.

First, the coated optical fiber F2 is exposed by removing the outer cover F3 on the distal end portion of the optical fiber cable F, and then the bare optical fiber F1 is exposed by removing the resin coat on the distal end portion of the coated optical fiber F2. The lengths of the bare optical fiber F1 and the coated optical fiber F2 are adjusted such that, in the clamping portion 4, the bare optical fiber F1 is accommodated in the positioning groove 44 and the distal end portion of the coated optical fiber F2 is accommodated in the outer cover accommodating groove 45a, and the end surfaces of the portion 34b of the first optical fiber 34 projecting from the back end of the ferrule 3 and the bare optical fiber F1 are abutted at a suitable pressing force.

The outer cover F3 of the optical fiber cable F is fit into the anchoring groove 53 of the anchoring fixture 5, and then the protecting portion 55 is fit onto the external periphery of the anchoring portion 50 of the anchoring fixture 5. Thereby, the optical fiber cable F is installed in the anchoring fixture 5. The optical fiber cable F is inserted through the ring 55, which serves as the protecting portion, before the ring 55 is fit onto the anchoring portion 50.

In the clamping portion 4 of the connector body 1, a wedge (not illustrated) has been inserted into the space between the base body 41 and the lid bodies 42 and 43, and the space between the base body 41 and the lid bodies 42 and 43 has been pressed open.

While the optical fiber cable F is anchored in the anchoring groove 53, the anchoring fixture 5 is pressed from the back end side of the connector body 1, and the connecting portions 25 and 56 are connected together. Thereby, the bare optical fiber F1 is inserted into the anchoring groove 44 of the clamping portion 4 by passing through the optical fiber insertion hole 24 of the housing 2. There, the bare optical fiber F1 is abutted against the portion 34b of the first optical fiber 34 that projects from the back end of the ferrule 3, and the first optical fiber 34 and the optical fiber cable F are optically connected. As shown in FIG. 5, when the first optical fiber 34 and the bare optical fiber F1 are abutted inside the clamping portion 4, the coated optical fiber F2 bends. As a result, due to the elasticity of the coated optical fiber F2, it is possible to ensure the abutting force between the end surfaces of the optical fibers 34 and F.

After the optical connection between the optical fibers 34 and F has been confirmed, the wedge (not illustrated) is removed and the space between the base body 41 and the lid bodies 42 and 43 is closed. Thus, due to the clamping force of the clamping portion 4 (specifically, the spring member 46), the optical fibers 34b and F1 are clamped and held between the elements 41, 42, and 43 in a state in which the end surfaces of the optical fibers 34b and F1 are abutted together, and thereby the optical connection between both of the optical fibers 34 and F is maintained.

In the optical connector A of the present embodiment, the ring-shaped protecting portion 55 is fit around the anchoring portion 50, and thereby the separation of the optical fiber cable F from the anchoring groove 53 can be prevented.

Thereby, the handling of the optical fiber cable F during attachment of the optical connector A becomes easy, the optical connection between the optical fiber cable F and the first optical fiber 34 can be carried out reliably by a simple operation.

As shown in FIG. 7, the connecting portions 25 and 56, which connect the anchoring fixture 5 and the connector body 1, form a movable connecting portion J, in which the direction of the anchoring fixture 5 relative to the connector body 1 can change when both are connected together. Thus, the movable connecting portion J moves flexibly depending on the bending of the optical fiber cable F what is pulled in the rearward direction of the anchoring fixture 5, and flexibility is obtained such that a bending stress is not concentrated locally on the optical fiber cable F. Therefore, an optical connector having superior handling characteristics is obtained.

Next, a second embodiment of the optical connector of the present invention will be explained with reference to FIG. 8 to FIG. 12.

Figure 8:
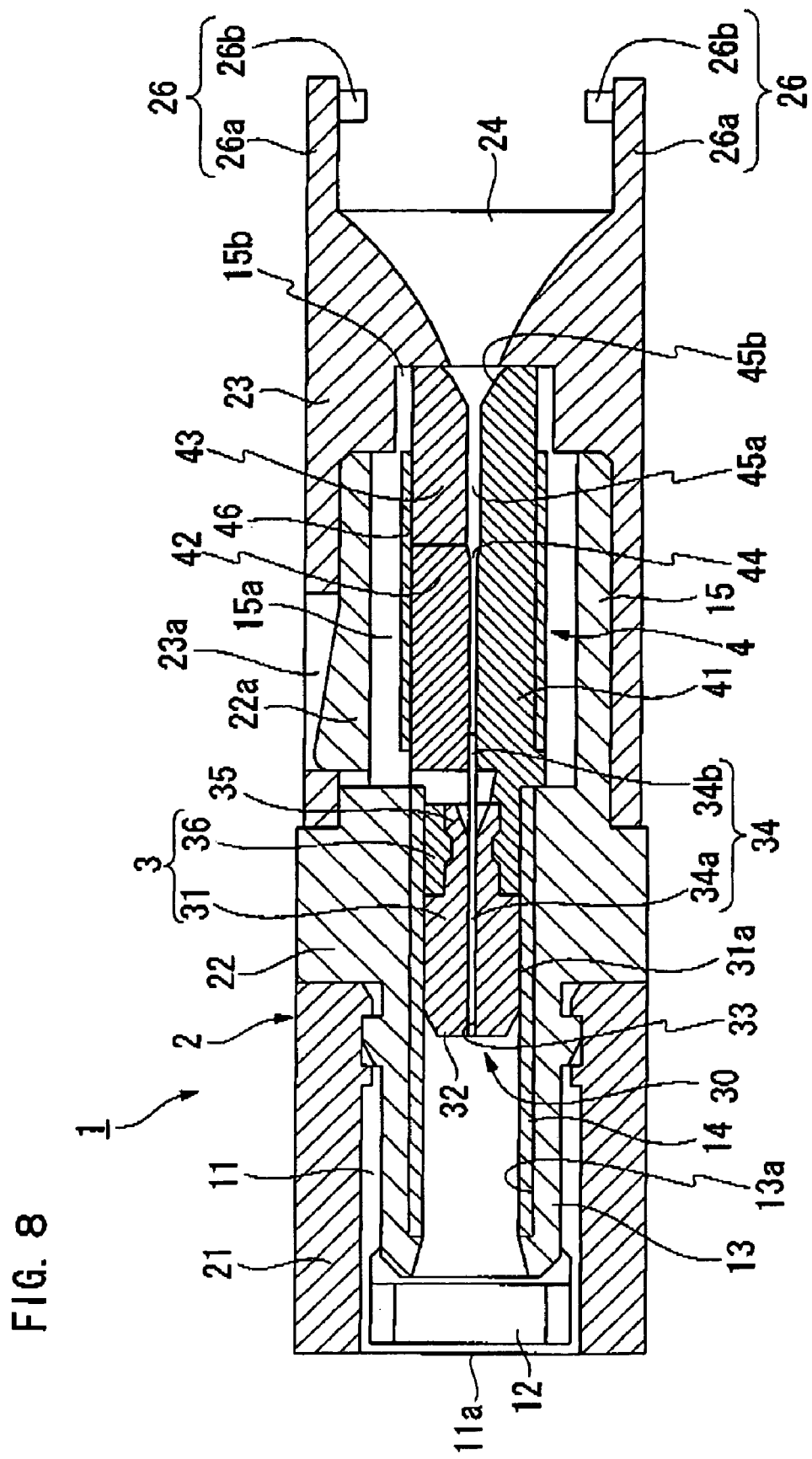
FIG. 8 is a longitudinal cross-sectional drawing showing the connector body in a second embodiment of the present invention.
Figure 9:
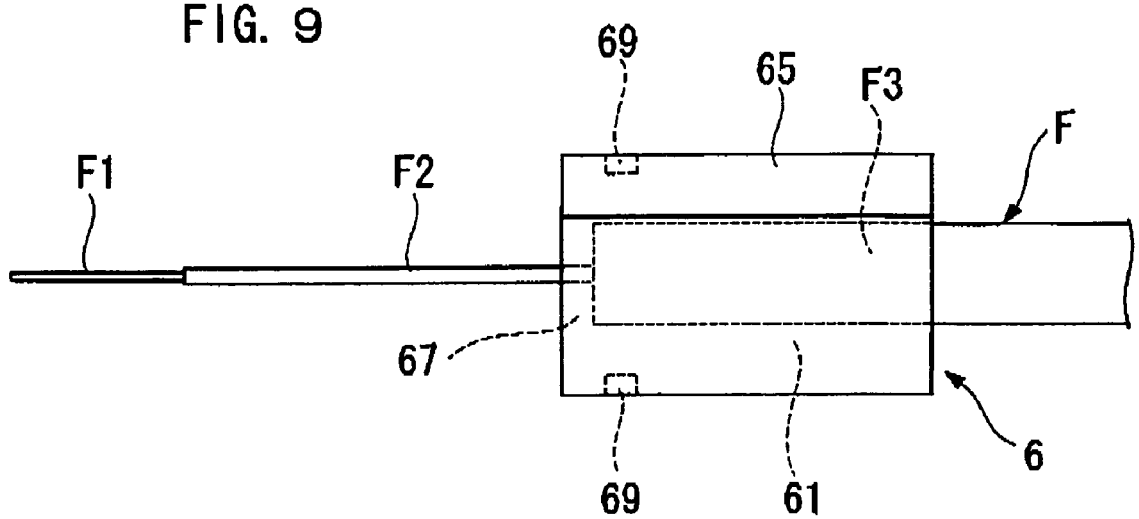
FIG. 9 is a frontal view showing the state in which the optical fiber cable and the protecting portion are installed in the anchoring fixture in a second embodiment of the present invention.
Figure 10:
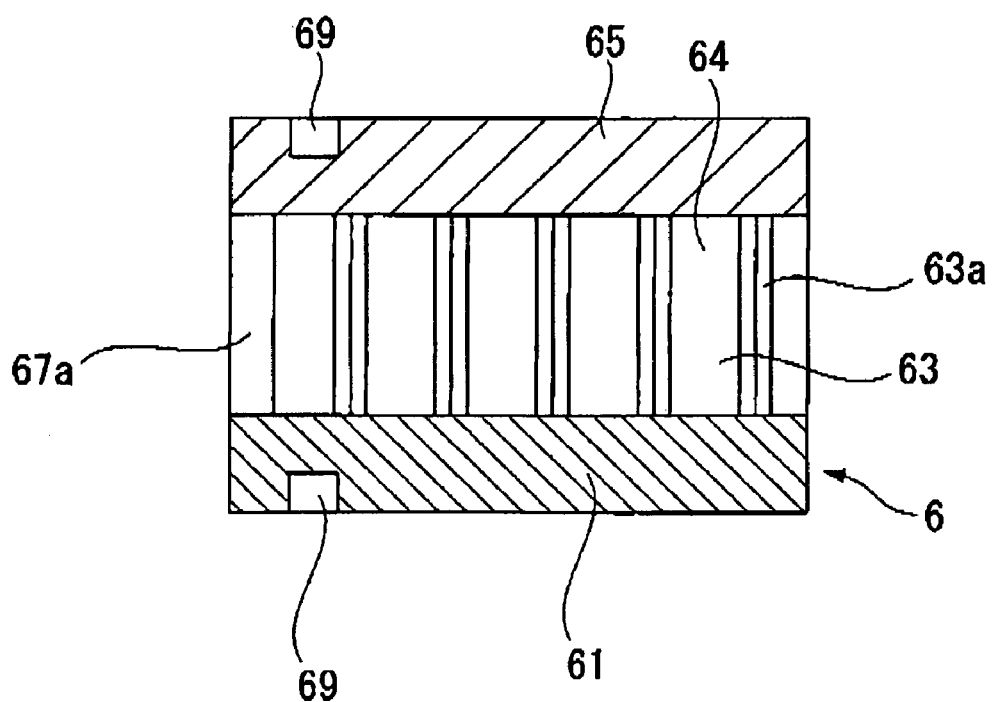
FIG. 10 is a longitudinal cross-sectional view showing the anchoring fixture and the protecting portion in a second embodiment of the present invention.
Figure 11:
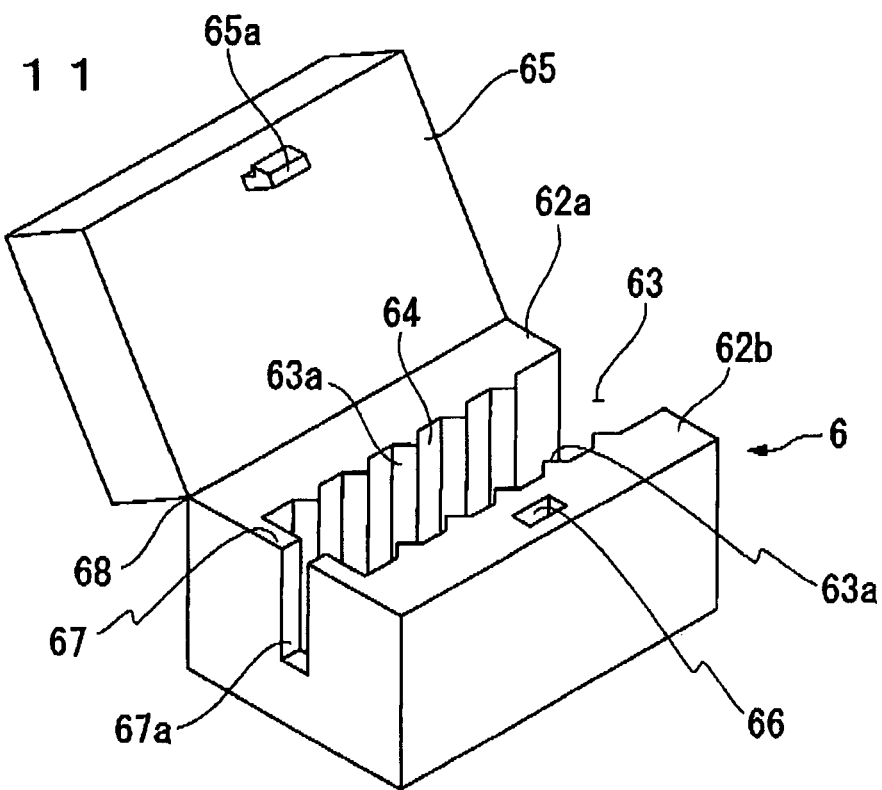
FIG. 11 is a perspective drawing showing the anchoring fixture and the protecting portion in a second embodiment of the present invention.
Figure 12:
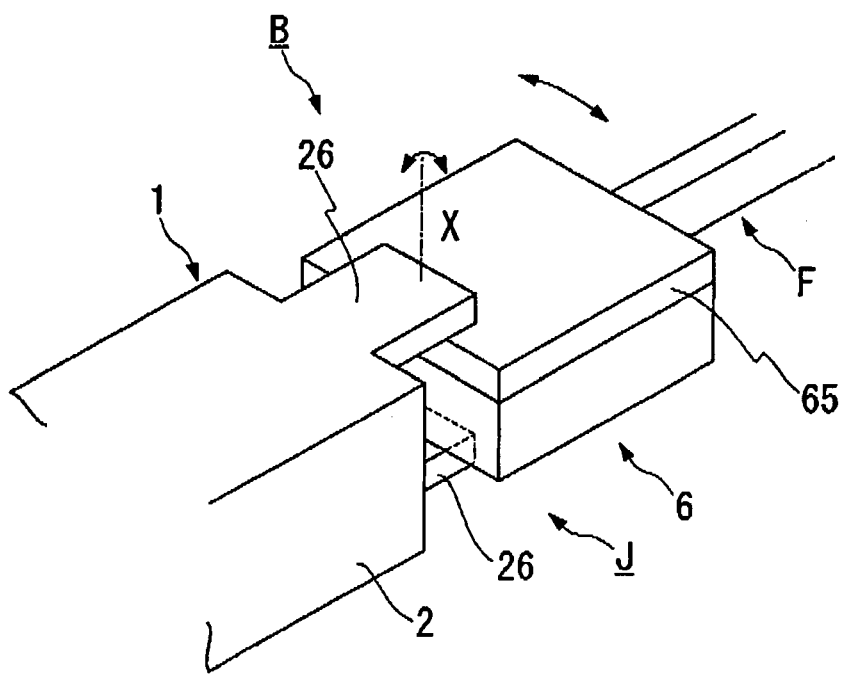
FIG. 12 is a schematic drawing showing the state in which the anchoring fixture is connected to the connector body in a second embodiment of the present invention.

FIG. 8 is a longitudinal cross-sectional view showing the optical connector in the second embodiment of the present invention. FIG. 9 is a frontal view showing the state in which the optical fiber cable and the protecting portion are attached to the anchoring fixture. FIG. 10 is a longitudinal cross-sectional view showing the anchoring fixture and the protecting portion. FIG. 11 is a perspective drawing showing the anchoring fixture and the protecting portion. FIG. 12 is a schematic drawing showing the state in which the anchoring fixture is connected to the connector body.

As shown in FIG. 8 and FIG. 9, the optical connector B of the second embodiment includes an connector body 1 that has a first optical fiber 34 housed in advance in a ferrule 3 so as to project from the back end of the ferrule 3 opposite the connecting end face 32, and an anchoring fixture 6 that has an anchoring groove 53 that anchors a second optical fiber cable F that is optically connected to the portion 34*b* of the first optical fiber 34 projecting from the back end of the ferrule 3 and is releasably connected to the connector body 1.

In the connector body 1 of the optical connector B of the present embodiment, the clamping portion equipped ferrule 30, the front portion housing 21, and the housing body 22 have structures that are identical to those of the optical connector A in the first embodiment. Connecting portions 26 that are connected by engaging the anchoring fixture 6 (described in detail below) are provided on the back end of the back portion housing 23. The connecting portions 26 of the back portion housing 23 include a pair of fitting projecting pieces 26*a* that project farther than the back end of the optical fiber insertion hole 24 and fitting projections 26*b* (shaft) that are formed singularly on the projecting ends of each of the projecting pieces 26*a*. The fitting projections 26*b* have a short cylindrical shape, and project on the inside of the projecting pieces 26*a* and 26*a* that oppose each other.

As shown in FIG. 10 and FIG. 11, in the optical connector B of the present embodiment, the anchoring fixture 6 that anchors the optical fiber cable F includes a bottom wall portion 61 and side wall portions 62*a* and 62*b* that project on both side edges of the bottom wall portion 61. An anchoring groove 63 that has a U-shape in cross-section (opening upward in FIG. 11) is formed in the space between both side wall portions 62*a* and 62*b*. The opening portion in the U-shaped groove serves as the insertion openings 64 for inserting the optical fiber cable F into the anchoring groove 63. Bead-shaped projections 63*a*, which hold the optical fiber cable F by compressing the outer cover F3 of the optical fiber cable F, project in plurality on both sides of the inner surface of the anchoring groove 63. Thereby, by fitting a portion of the optical fiber cable F that is covered by the outer cover F3 into the anchoring groove 63, it is possible accommodate and fasten the optical fiber cable F in the anchoring groove 63. Preferably, the resistance to extraction of the optical fiber cable F due to the compression by the projections 63*a* is equal to or greater than 5 kgf.

The anchoring groove 63 includes a front end wall 67 that projects beyond both side wall portions 62*a* and 62*b* on the distal end side (the left side in FIG. 10) of the anchoring fixture 6, which is the side facing the connector body 1, when mounted in the connector body 1. The front end wall 67 has a notch-shaped gap 67*a* in the center portion of the anchoring groove 63 in the widthwise direction (the direction orthogonal to the direction of the extension of the anchoring groove 63). The amount of the opening of the gap 67*a* of the front end wall 67 is sufficiently large to allow the insertion of the coated optical fiber F2, but not allow the insertion of the outer cover F3 of optical fiber cable F. As shown in FIG. 9, when the optical fiber cable F is anchored in the anchoring groove 63, the end part of the outer cover F3 is prevented from projecting out to the distal end side (the left side in FIG. 9) of the anchoring fixture 6 by this front end wall 67.

In this anchoring fixture 6, a lid 65 that covers the insertion opening 64 of the anchoring groove 63 is provided integrally with the anchoring fixture 6 via a hinge 68 formed along one of the side wall portion 62*a* of the anchoring fixture 6. The lid 65 can be closed by engaging the engaging projection 65*a* in the engaging recess 66. The engaging projection 65*a* projects on the side edge portion of the side opposed to the hinge 68 of the lid 65, and the engaging recess 66 is formed in the other of the side wall portion 62*b* on the side opposed to the hinge 68 of the anchoring fixture 6. While the lid 65 is closed, the separation of the optical fiber cable F from the anchoring groove 63 can be prevented. Specifically, the lid 65 functions as a protecting portion 65 that prevents the separation of the optical fiber cable F from the anchoring groove 63. Furthermore, while the connector body 1 and the anchoring fixture 6 are connected, because the anchoring fixture 6 and the lid 65 are held while being sandwiched by the pair of connecting portions 26 of the connector body 1, the structure is one in which the lid 65 does not open. Thereby, the separation of the optical fiber cable F can be more reliably prevented.

Engaging holes 69 are formed on the bottom wall side 61 and the lid 65 of the anchoring fixture 6 at opposed positions on the top and bottom (refer to FIG. 10) of the anchoring fixture 6 while the lid 65 is closed. The engaging holes 69 are round holes that enable the engagement of the connecting portions 26 of the connector body 1 side described above with the fitting projections 26*b*, and function as a connecting portion (bearing) on the anchoring fixture 6 side.

The optical connector B of the present embodiment releasably connects the connector body 1 and the anchoring fixture 6 by fitting the fitting projections 26*b* of the connecting portion 26 of the connector body 1 and the engaging holes 69 of the anchoring fixture 6. Furthermore, as shown in FIG. 12, while the connector body 1 and the anchoring fixture 6 are connected, a movable connecting portion J is formed having a pivot axis X on which the engagement between the engaging projections 26*b* and the engaging holes 69 can rotate relative to the connector body 1 and the anchoring fixture 6. Thereby, it is possible for the direction of the anchoring fixture 6 to change freely with respect to the connector body 1.

The anchoring groove 63 is formed such that the directions in which both side wall portions 62*a* and 62*a* oppose each other is in the direction of the thickness T of the optical fiber cable F (refer to FIG. 4), and the axial direction of the pivot axis X is the direction of the width W of the optical fiber cable F. Thereby, the anchoring fixture 6 can follow the bending of the optical fiber cable F in the thickness direction by rotating around the pivot axis X (shown by both arrows in FIG. 12).

Next, an example of the procedure for attaching the optical connector B of the present embodiment to the distal end portion of the optical fiber cable F will be explained.

First, the coated optical fiber F2 is exposed by removing the outer cover F3 on the distal end portion of the optical fiber cable F, and then the bare optical fiber F1 is exposed by removing the resin coat on the distal end portion of the coated optical fiber F2. The outer cover F3 of the optical fiber cable F is fit into the anchoring groove 63 of the anchoring fixture 6, and then the lid 65 is closed. At this time, the coated optical fiber F2 is inserted through the notch 67*a* of the front end wall 67 of the anchoring fixture 6.

Note that in the present embodiment, because there is no projection more forward than this front end wall 67 present on the anchoring fixture 6, a procedure is possible in which the optical fiber cable F is mounted in the anchoring fixture 6 after removing the outer cover F3 on the distal end portion of the optical fiber cable F and exposing the coated optical fiber F2, and subsequently, the exposure of the bare optical fiber F1 (removing the resin coat of the coated optical fiber F2) and the adjustment (cutting or the like) of the lengths of the bare optical fiber F1 and the coated optical fiber F2 can be carried out. In this case, the projection length of the coated optical fiber F2 and the bare optical fiber F1 from the front end wall 67 is easily and reliably adjusted on the basis of the front end wall 67. Therefore, even when the end portion of the outer cover F3 of the optical fiber cable F is unevenly formed, the lengths of the coated optical fiber F2 and the bare optical fiber F1 can be easily and reliably adjusted.

In the clamping portion 4 of the connector body 1, a wedge (not illustrated) is inserted between the base body 41 and the lid bodies 42 and 43, and a space between the base body 41 and the lid bodies 42 and 43 is opened.

While the optical fiber cable is anchored in the anchoring groove 63, the anchoring fixture 6 is pressed from the back end side of the connector body 1, and the connecting portions 26 and 69 are connected together. Thereby, although not specially illustrated, the bare optical fiber F1 is inserted into the positioning groove 44 of the clamping portion 4 by passing through the optical fiber insertion hole 24 of the housing 2, and there abuts the portion 34*b* of the first optical fiber 34 that projects from the back end of the ferrule 3, and thereby the first optical fiber 34 and the optical fiber cable F are optically connected.

In the optical connector B of the present embodiment, as shown in FIG. 12, because a movable portion is formed that enables the direction of the anchoring fixture 6 to vary relative to the connector body 1 while the connecting portions that connect the anchoring fixture 6 and the connector body 1 are both connected, the movable connecting portion J moves flexibly depending on the bending of the optical fiber cable F that is pulled towards the back of the anchoring fixture 6, and flexibility characteristics are obtained such that a bending stress is not concentrated locally on the optical fiber cable F. Therefore, an optical connector having superior handling characteristics is obtained.

Because the lid 65 that serves as a protecting portion is engaged in the anchoring fixture 6, separation of the optical fiber cable F from the anchoring groove 63 can be prevented. Thereby, the handling of the optical fiber cable F during attachment of the optical connector B becomes easy, and the optical connection between the optical fiber cable F and the first optical fiber 34 can also be carried out reliably by a simple operation. Because the protecting portion (lid) 65 is provided integrally on the anchoring fixture 6, the protecting portion cannot become lost. In addition, the number of parts necessary for the attachment of the optical connector B becomes small, and it is possible to further simplify the attachment operation of the optical connector.

In addition, because a front end wall 67 is provided that prevents the end portion of the outer cover F3 of the optical fiber cable F from projecting to the distal end side of the anchoring fixture 6, it is possible to adjust the lengths of the coated optical fiber F2 and the bare optical fiber F1 easily and reliably.

Next, a third embodiment of the optical connector of the present invention will be explained with reference to the figures. Below, in the explanation of the third embodiment, parts identical to those in the embodiments described above are denoted by the same reference symbols, and their explanation has been omitted.

FIG. 16 and FIG. 13 to FIG. 17 are drawings showing the optical connector of the third embodiment of the present invention.

Figure 13:
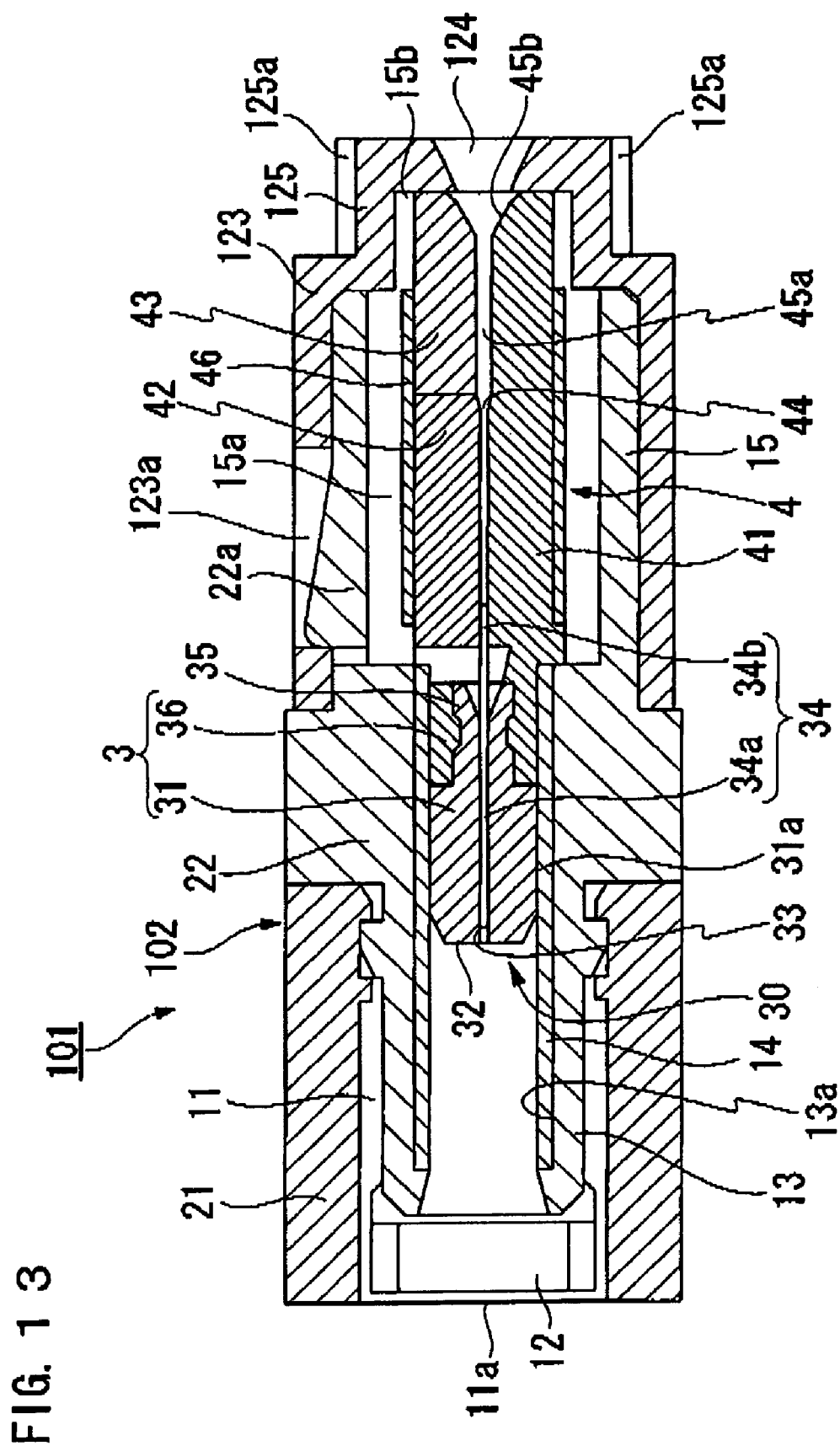
FIG. 13 is a longitudinal cross-sectional drawing showing the connector body in the third embodiment of the present invention.
Figure 14:
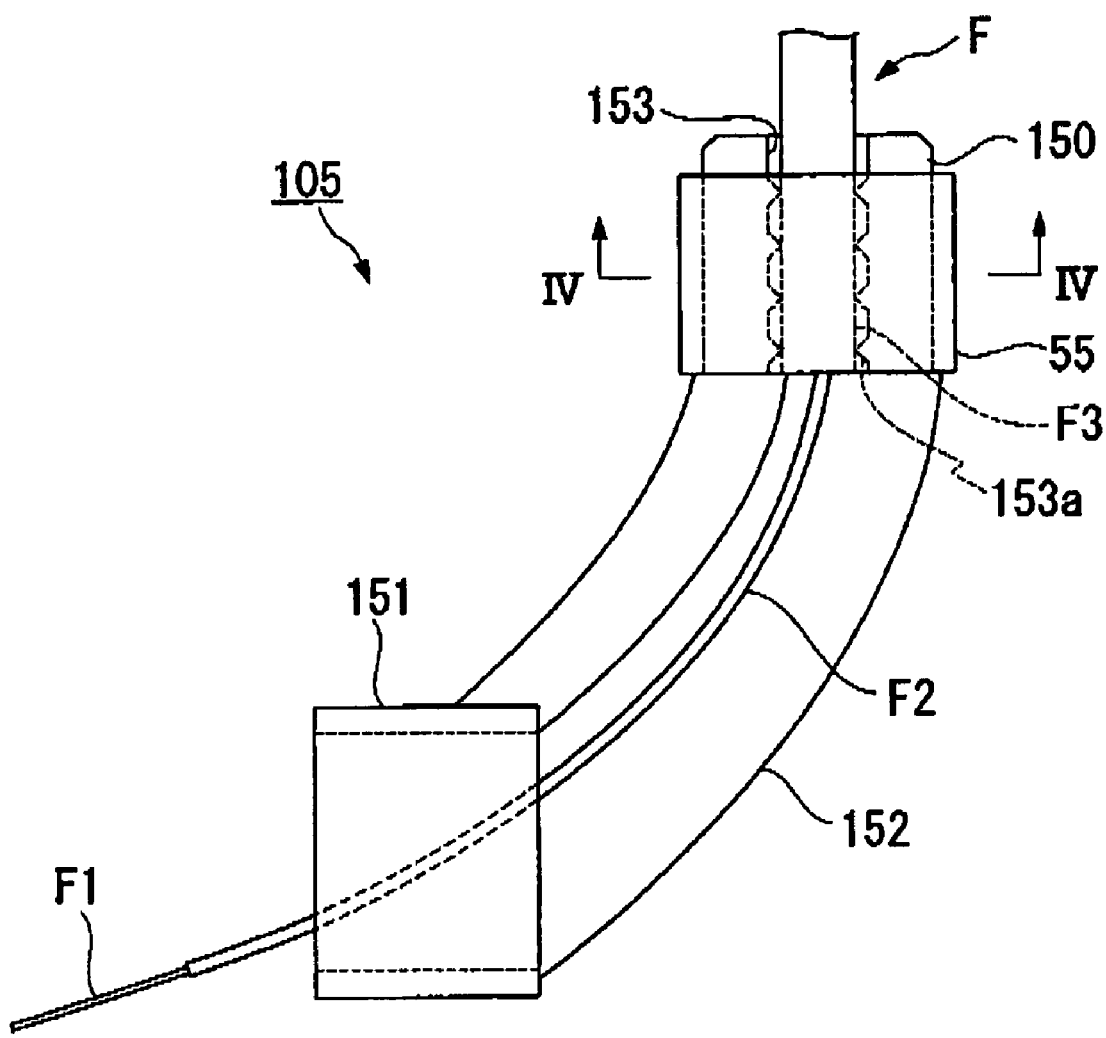
FIG. 14 is a frontal view showing the state in which the optical fiber cable and the protecting portion are installed on the anchoring fixture in the third embodiment.
Figure 15A:
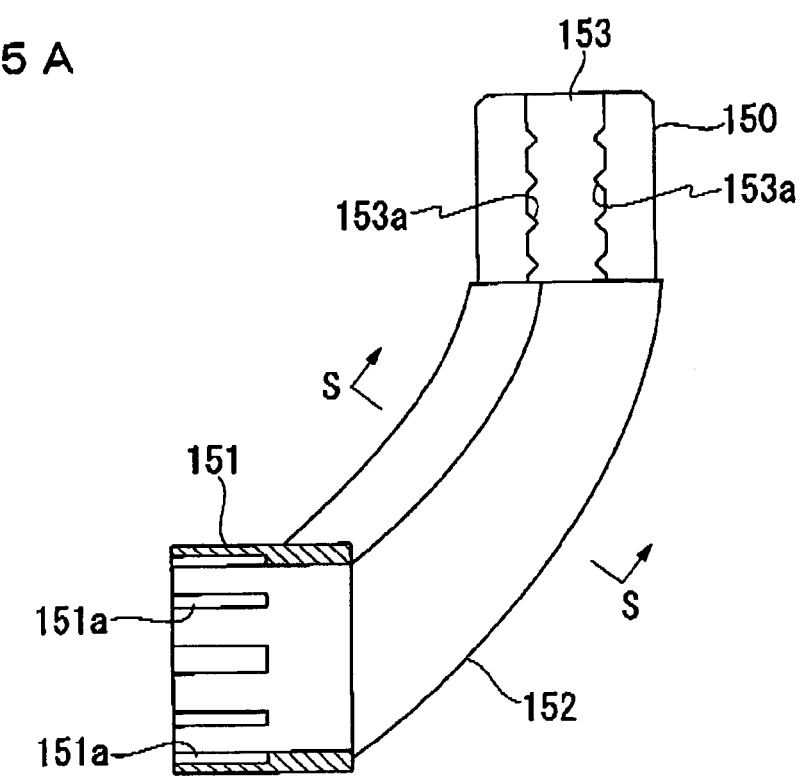
FIG. 15A is a partial cut-away frontal view showing the anchoring fixture in the third embodiment of the present invention.
Figure 15B:
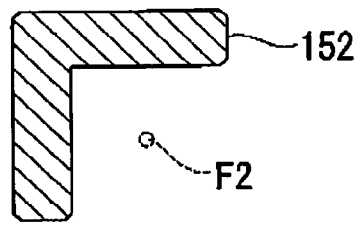
FIG. 15B is a cross-sectional drawing taken along the line S-S in FIG. 15A.
Figure 16:
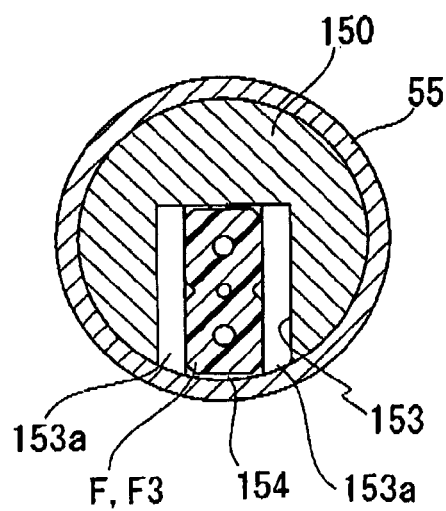
FIG. 16 is a cross-sectional drawing along line IV-IV in FIG. 14.
Figure 17:
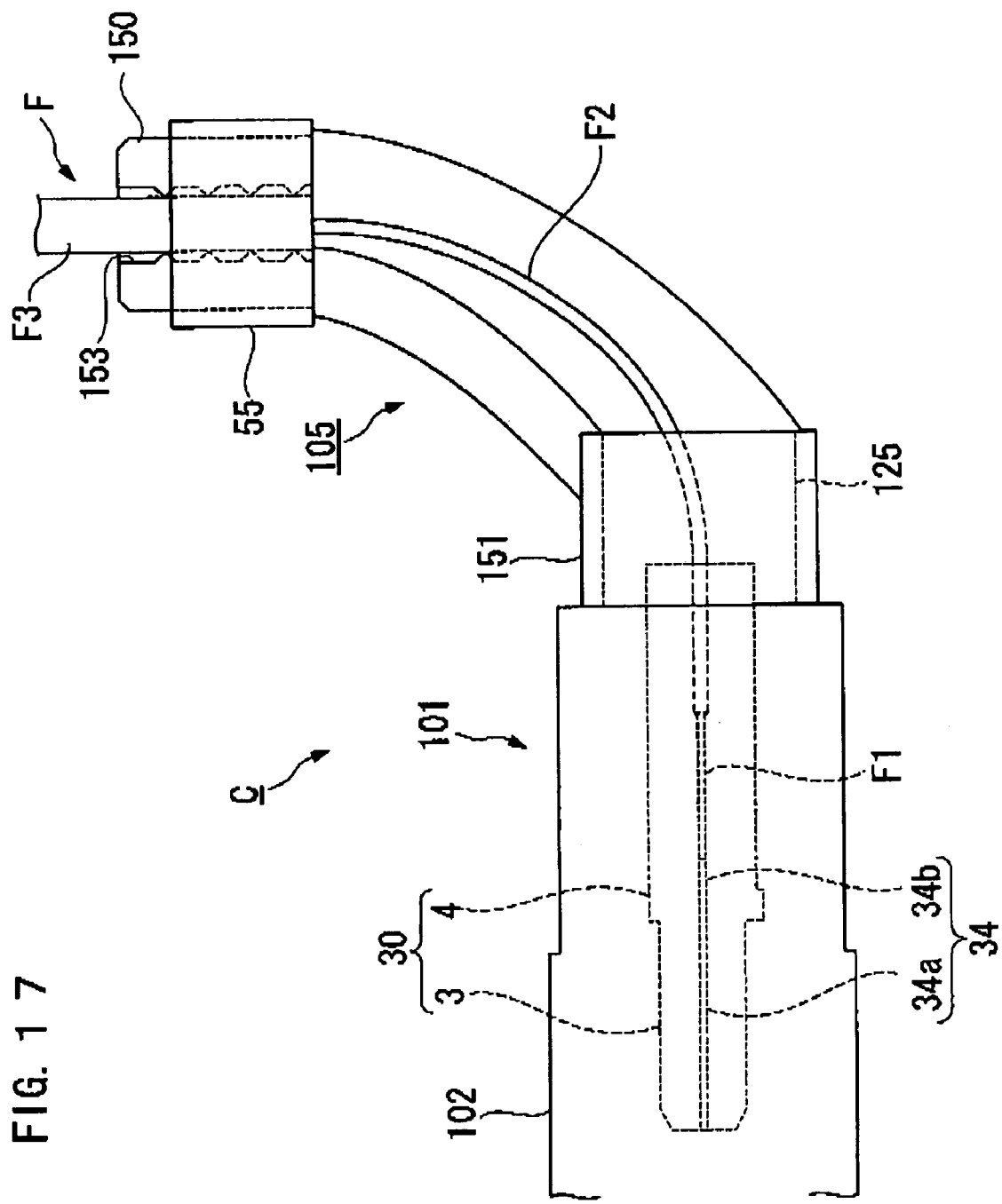
FIG. 17 is a schematic drawing showing the state in which the anchoring fixture is connected to the connector body in the third embodiment of the present invention.
Figure 18:
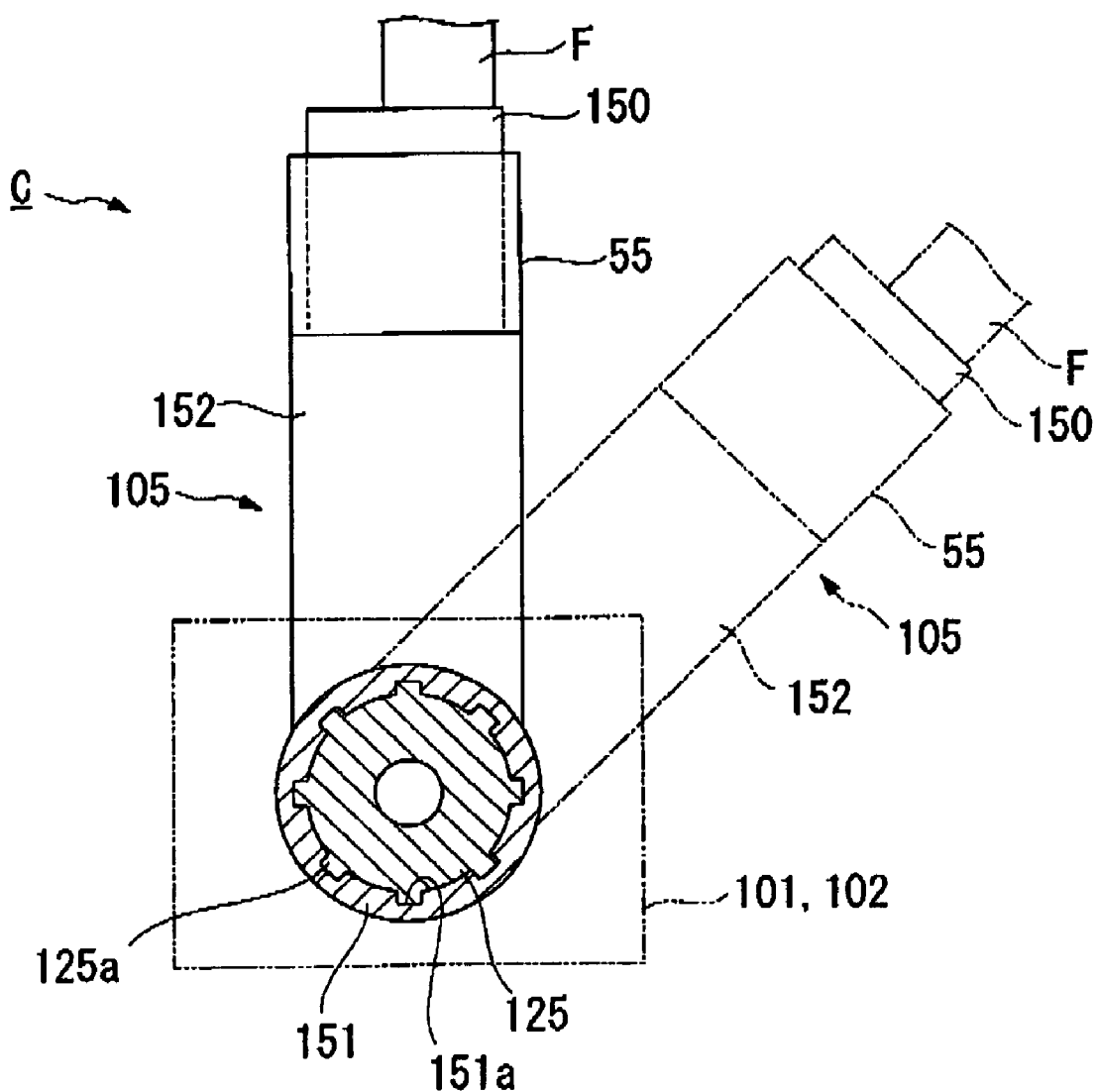
FIG. 18 is a schematic drawing that explains the relative direction of the anchoring fixture relative to the connector body.

FIG. 13 is a longitudinal cross-sectional view showing the connector body of the optical connector of the present embodiment. FIG. 14 is a frontal view showing the state in which the optical fiber cable and the protecting portion are installed on the anchoring fixture. FIG. 15A is a partial cut-away view showing the anchoring fixture in the present embodiment. FIG. 15B is a cross-sectional drawing along line S-S in FIG. 15A. FIG. 16 is a cross-sectional drawing taken along the line IV-IV in FIG. 14. FIG. 17 is a schematic drawing showing the state in which the anchoring fixture is connected to the connector body in the present embodiment. FIG. 18 is a schematic drawing for explaining the direction of the anchoring fixture relative to the connector body in the present embodiment.

As shown in FIG. 13, FIG. 14, FIG. 15A, and FIG. 15B, the optical connector C of the present embodiment includes a connector body 1 and an anchoring fixture 105. The connector body 1 has a first optical fiber 34 housed in advance in the ferrule 3 so as to project from the back end of the ferrule 3 opposite to the connecting end surface 32. The anchoring fixture 105 has an anchoring groove 153 that anchors the second optical fiber F that is optically connected to the portion 34*b* of the first optical fiber 34, which projects from the back end of the ferrule 3, and can be releasably connected to the connector body 101.

As shown in FIG. 13 or the like, the housing 102 is formed by a housing body 22 having a sleeve holder 13 that accommodates the ferrule 3 and a clamp portion accommodating portion 15 that accommodates the clamping portion 4; a front portion housing 21 attached to the side of the sleeve holder 13 of the housing body 22; and a back portion housing 123 that is attached to the side of the clamping portion accommodating portion 15 of the housing body 22.

An engaging catch 22*a* that can engage the engaging hole 123*a* formed in the back portion housing 123 is provided on the side portion of the clamping portion accommodating portion 15. The housing body 22 and the back portion housing 123 are releasably engaged by fitting the back portion housing 123 over the periphery of the clamping portion accommodating portion 15 and engaging the engaging catch 22*a* of the housing body 22 in the engaging hole 123*a* of the back portion housing 123. The separation of clamping portion 4, which has been accommodated in the clamping portion accommodating portion 15, from the opening portion 15*b* is prevented by the back portion housing 23 engaged in the housing body 22.

The back portion housing 123 in the third embodiment includes an optical fiber insertion hole 124 that communicates with the opening portion 15*b* of the clamping portion accommodating portion 15 while engaged in the housing body 122 and a connecting portion 125 for connecting the anchoring fixture 105 with the connector body 101.

The connecting portion 125 projects on the back end side of the back portion housing 123. As shown in FIG. 18, the connecting portion 125 has an external surface that is substantially cylindrical, and eight engaging ribs 125*a* project at intervals of 45° on the outer periphery of the connecting portion 125.

As shown in FIG. 13, the optical fiber insertion hole 124 has a tapered shape that expands towards the back end of the back end housing 123. The optical fiber insertion hole 124 narrows from the back end of the back end housing 123 towards the tapered hole 45b of the clamping portion 4.

As shown in FIG. 14 and FIG. 15A, the anchoring fixture 105 is formed by providing on each end of the curved base portion 152 a connecting portion 151 that can connect to the connecting portion 125 of the back portion housing 123 of the connector body 101, and an anchoring portion 150 that anchors an optical fiber cable F. The base portion 152 of the anchoring fixture 105 is bent such that the connecting portion 151 and the anchoring portion 150 are disposed 90° to each other. As shown in FIG. 15B, the base portion 152 is formed as an L-shaped groove in cross-section, and a space is secured in which the coated optical fiber F2 can freely bend (refer to FIG. 17).

As shown in FIG. 18, the connecting portion 151 has a substantially cylindrical outer surface, and eight engaging grooves 151a are formed at intervals of 45° on the inner surface of the connecting portion 151. The optical connector C of the present embodiment releasably connects the connector body 101 and the anchoring fixture 105 by engaging the engaging rib 125a of the connecting portion 125 of the connector body 101 and the engaging groove of the connecting portion 151a of the connection portion 151 of the anchoring fixture 105.

As shown in FIG. 16, an anchoring groove 153 having a U-shape in cross-section (opening downward in FIG. 16) is formed on the anchoring portion 150, and the opening portion that opens in this U-shaped groove serves as an insertion opening portion 154 for inserting the optical fiber cable F into the anchoring groove 153. As shown in FIG. 14 and FIG. 15A, bead shaped projections 153 that grasp the optical fiber cable F by compressing the outer cover F3 of the optical fiber cable F project in plurality on the both inner surfaces of the anchoring groove 153. Thereby, it is possible to accommodate and fasten the optical fiber cable F in the anchoring groove 153 by fitting a portion of the optical fiber cable F covered by the outer cover F3 into the anchoring groove 153. Preferably, the resistance to extraction of the optical fiber cable F due to the compression of the projections 153a is preferable equal to or greater than 5 kgf.

The outer peripheral surface of the anchoring portion 150 is substantially cylindrical. In the anchoring fixture 105, the insertion opening portion 154 of the anchoring groove 153 is closed by mounting the ring-shaped protecting portion 55 on the anchoring portion 150, and thereby the separation of the optical fiber cable F from the anchoring groove 153 is prevented.

Next, an example of the procedure for attaching the optical connector C of the present embodiment to the distal end portion of the optical fiber cable F will be explained.

First, the coated optical fiber F2 is exposed by removing the outer cover F3 on the distal end portion of the optical fiber cable F, and then the bare optical fiber F1 is exposed by removing the resin coat on the distal end portion of the coated optical fiber F2. The lengths of the bare optical fiber F1 and the coated optical fiber F2 are adjusted such that, in the clamping portion 4, the bare optical fiber F1 is accommodated in the positioning groove 44 and the distal end portion of the coated optical fiber F2 is accommodated in the outer cover accommodating groove 34a, and the end surfaces of the portion 45b of the first optical fiber 34 projecting from the back end of the ferrule 3 and the bare optical fiber F1 are abutted at a suitable pressing force.

The outer cover F3 of the optical fiber cable F is fit into the anchoring groove 153 of the anchoring fixture 105, and then the protecting portion 55 is fit onto the external periphery of the anchoring portion 150 of the anchoring fixture 105. Thereby, the optical fiber cable F is installed in the anchoring fixture 105. The optical fiber cable F is inserted through the ring 55, which serves as the protecting portion, before the ring 55 is fit onto the anchoring portion 150.

In the clamping portion 4 of the connector body 101, a wedge (not illustrated) has been inserted into the space between the base body 41 and the lid bodies 42 and 43, and the space between the base body 41 and the lid bodies 42 and 43 has been pressed open.

While the optical fiber cable F is anchored in the anchoring groove 153, the anchoring fixture 105 is pressed from the back end side of the connector body 101, and the connecting portions 125 and 151 are connected together. Thereby, as shown in FIG. 15A, the bare optical fiber F1 is inserted into the anchoring groove 44 of the clamping portion 4 by passing through the optical fiber insertion hole 124 of the housing 2. There, the bare optical fiber F1 is abutted against the portion 34a of the first optical fiber 34 that projects from the back end of the ferrule 3, and the first optical fiber 34 and the optical fiber cable F are optically connected.

After the optical connection between the optical fibers 34 and F has been confirmed, the wedge (not illustrated) is removed and the space between the base body 41 and the lid bodies 42 and 43 is closed. Thus, due to the clamping force of the clamping portion 4 (specifically, the spring member 46), the optical fibers 34 and F are clamped and held between the elements 41, 42, and 43 in a state in which the end surfaces of the optical fibers 34 and F are abutted together, and thereby the optical connection between both of the optical fibers 34 and F is maintained.

In the optical connector C of the present embodiment, the ring-shaped protecting portion 55 is fit around the anchoring portion 150, and thereby the separation of the optical fiber cable F from the anchoring groove 153 can be prevented.

Thus, the handling of the optical fiber cable F during attachment of the optical connector C becomes easy, and the optical connection between the optical fiber cable F and the first optical fiber 34 can be carried out reliably by a simple operation.

In addition, when the optical fibers F1 and 34b are abutted, the coated optical fiber F2 is deformed by bending (curving deformation) due to the abutment force, but the anchoring fixture 105 has a structure in which the coated optical fiber F2 is held in advance while bending along the base portion 152. Thus, local bending of the coated optical fiber F2 can be avoided, and no forced bending occurs in the coated optical fiber F2. As a result, it is possible to suppress an increase in the optical loss due to forced bending of the coated optical fiber F2.

Because the engaging ribs 125a and the engaging grooves 151a of the connecting portions 125 and 151 are formed at equal intervals so as to divide the periphery into eight equal segments, as shown in FIG. 18, it is possible to change the direction of the anchoring groove 153 of the anchoring fixture 105 with respect to the connector body 101 in eight ways by changing the direction when the anchoring fixture 105 is engaged with the connector body 101. Thereby, for example, it is possible to align the direction of the extension of the optical fiber cable depending on the environment in proximity to the optical connector. For example, when the optical connector is accommodated in an outlet, the direction in which the optical fiber extends can be selected so as to be near the position of the entrance of the outlet.

Next, a fourth embodiment of the optical connector of the present invention will be explained with reference to the figures. Below, in the explanation of the optical connector of the fourth embodiment, elements identical to those in the embodiments described above are denoted by identical reference symbols, and their explanations have been omitted.

FIG. 19 to FIG. 28 are drawings showing the optical connector according to the fourth embodiment of the present invention.

Figure 19:
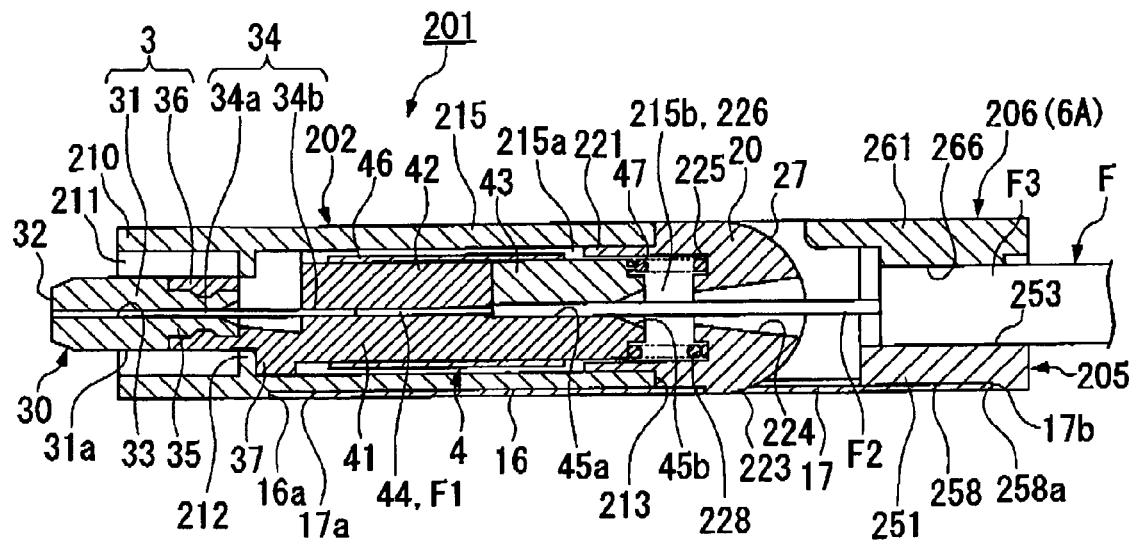
FIG. 19 is a longitudinal cross-sectional drawing showing the optical connector in the fourth embodiment of the present invention.
Figure 20:
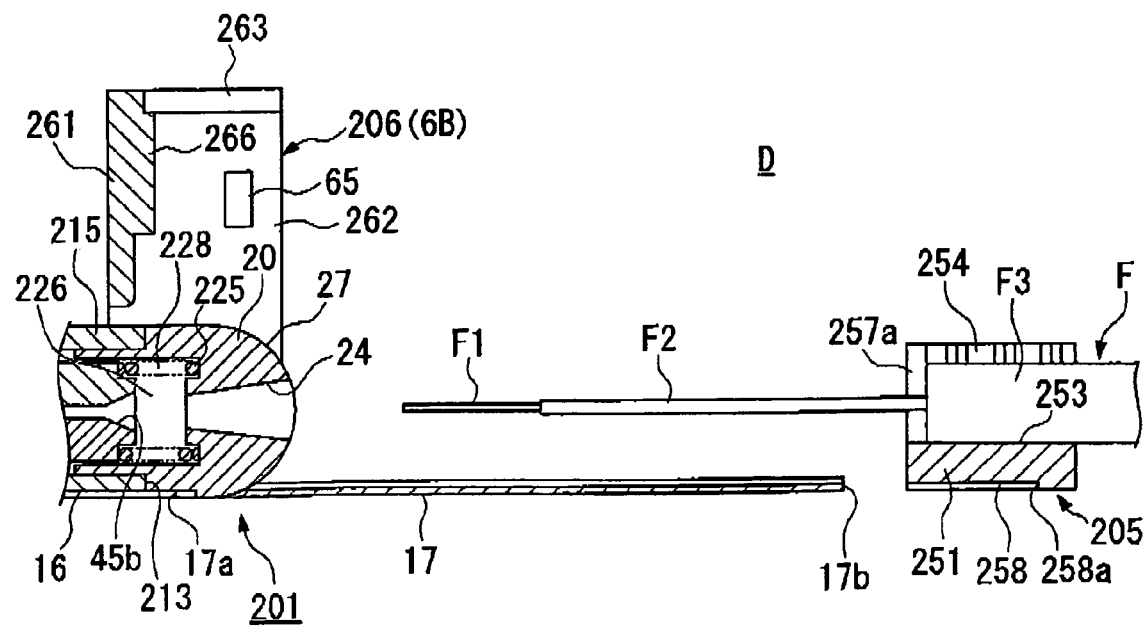
FIG. 20 is a longitudinal cross-sectional drawing showing the state in which the anchoring fixture is pressed towards the connector body in the optical connector in FIG. 19.
Figure 21:
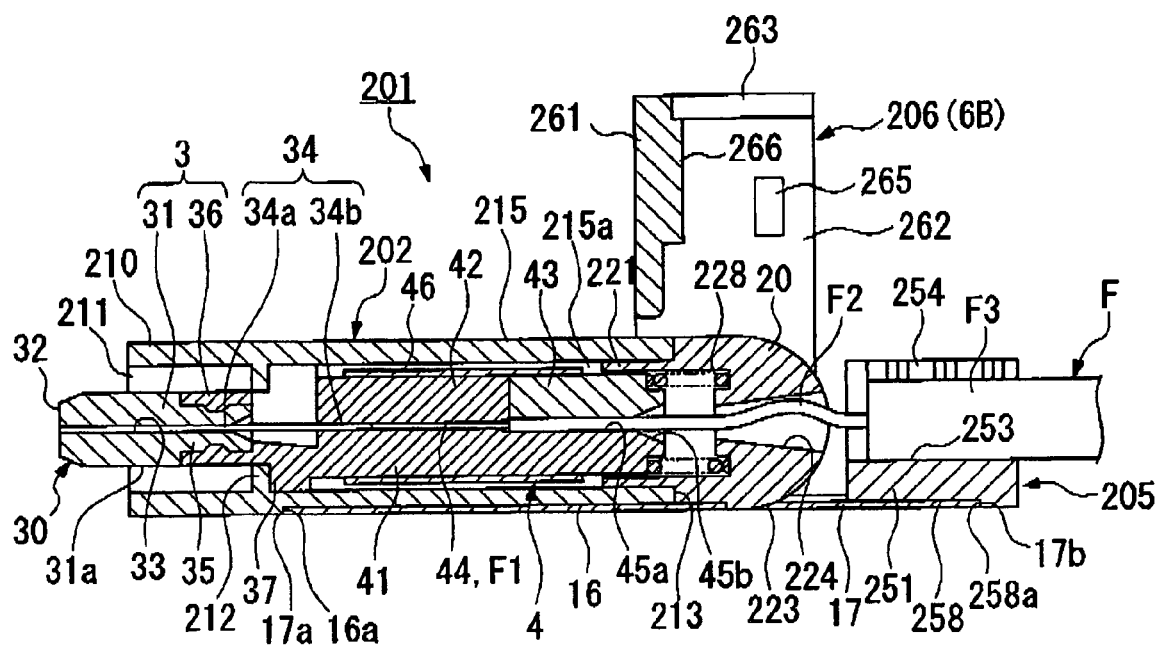
FIG. 21 is a longitudinal cross-sectional drawing showing the state in which the anchoring fixture is pressed towards the connector body and the optical fibers are abutted together in the optical connector in FIG. 19.
Figure 22:
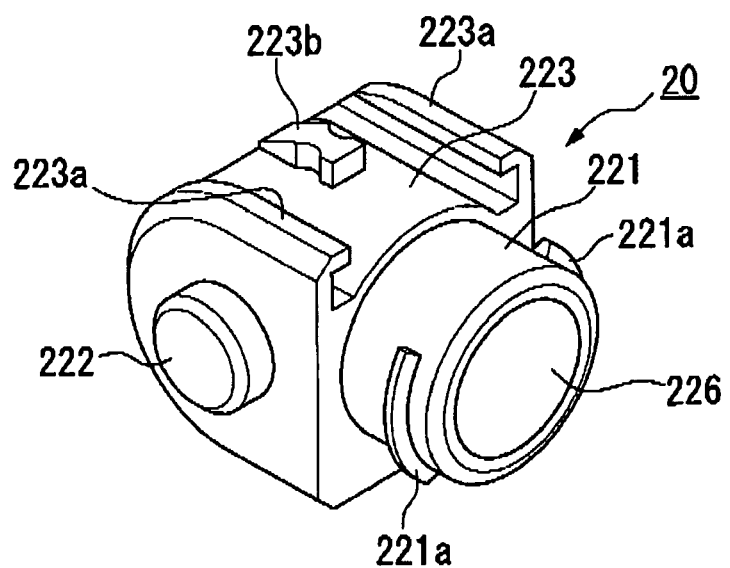
FIG. 22 is a perspective drawing showing the spring press in the optical connector in FIG. 19.
Figure 23:
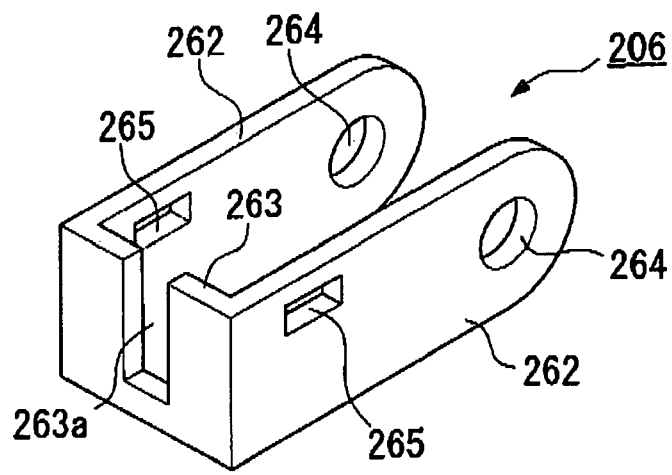
FIG. 23 is a perspective drawing showing the protecting portion in the optical connector in FIG. 19.
Figure 24:
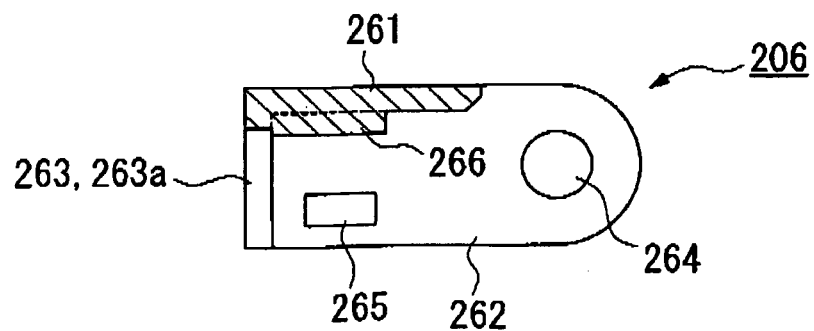
FIG. 24 is a longitudinal cross-sectional drawing showing the protecting portion in the optical connector in FIG. 19.
Figure 25:
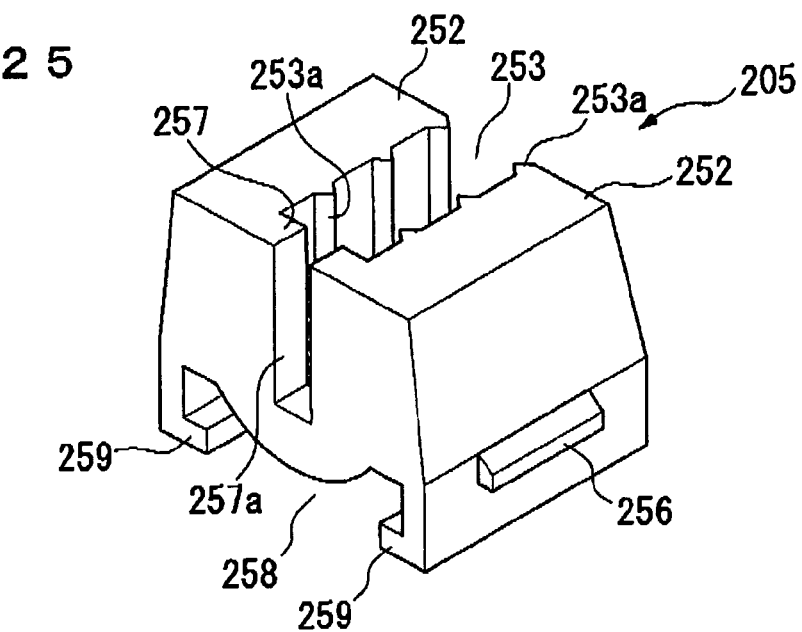
FIG. 25 is a perspective drawing showing the anchoring fixture in the optical connector in FIG. 19.
Figure 26:
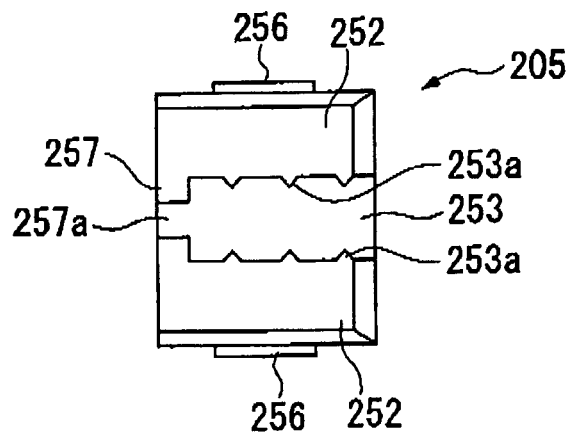
FIG. 26 is a plane view showing the anchoring fixture in the optical connector in FIG. 19.
Figure 27:
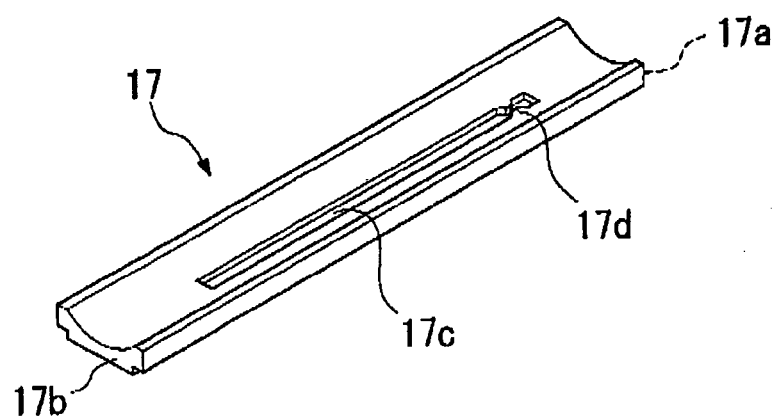
FIG. 27 is a perspective view showing the sliding portion in the optical connector in FIG. 19.
Figure 28:
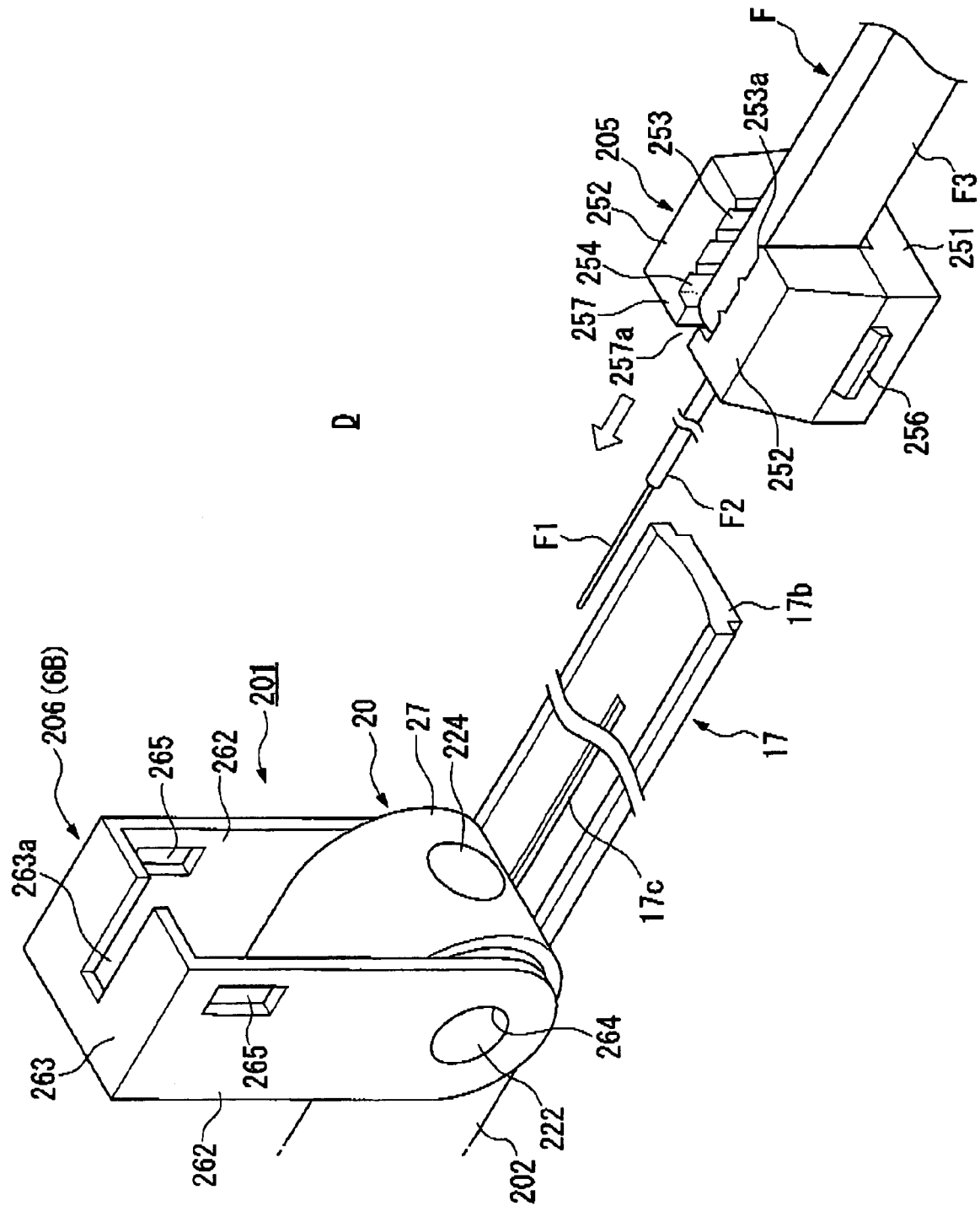
FIG. 28 is a perspective view showing the state in which the anchoring fixture is pressed towards the connector body in the optical connector in FIG. 19.

FIG. 19 is a longitudinal cross-sectional view showing the optical connector according to a fourth embodiment of the present invention. FIG. 20 is a longitudinal view showing the state in which the anchoring fixture is pressed towards the optical connector in the optical connector in FIG. 19. FIG. 21 is a longitudinal cross-sectional view showing the state in which the anchoring fixture is pressed towards the connector body and the optical fibers are abutted together in the optical connector in FIG. 19. FIG. 22 is a perspective view showing the spring press. FIG. 23 is a perspective view showing the protecting portion. FIG. 24 is a longitudinal cross-sectional view of the protecting portion. FIG. 25 is a perspective view showing the anchoring fixture. FIG. 26 is a plane view showing the anchoring fixture. FIG. 27 is a perspective view showing the sliding portion. FIG. 28 is a perspective view showing the state in which the anchoring fixture is pressed towards the connector body.

As shown in FIG. 19, FIG. 20, and FIG. 21, the optical connector D of the present embodiment includes a connector body 201 and an anchoring fixture 205. The connector body 201 has a first optical fiber 34 housed in advance in the ferrule 3 so as to project from the back end of the ferrule 3 opposite to the connecting end surface 32. The anchoring fixture 205 has an anchoring groove 253 that anchors the second optical fiber F optically connected to the portion 34b of the first optical fiber 34, which projects from the back end of the ferrule 3, and can be releasably connected to the connector body 201.

As shown in FIG. 19, the connector body 201 includes a ferrule 3 in which a first optical fiber 34 is housed in advance; a clamping portion 4 that maintains the abutted and connected state between the portion 34b of the first optical fiber 34 that projects from the back end of the ferrule 3 and the optical fiber cable F; a housing 202 that accommodates the ferrule 3 and the clamping portion 4; and a protecting portion 206 pivoted to enable rotation on the spring press 20 on the back end (the right side in FIG. 19) of the housing 202. Note that in the optical connector of the present embodiment, the protecting portion 206 doubles as the connecting portion for connecting the anchoring fixture to the connector body, and below the protecting portion 206 may be referred to as a connecting portion 206.

The clamping portion 4 connects with the ferrule 3 so as to extend from the flange 37 provided on the back end of the ferrule 3 opposite to the connecting end surface 32. That is, by integrating the ferrule 3 and the clamping portion 4 via the flange 37, a clamping portion equipped ferrule 30 can be formed.

The ferrule 3 is exposed at the opening portion 211 that is opened in the distal end (the left side in FIG. 19) of the housing 202. This optical connector D functions as an optical connector plug.

The ferrule 3 includes a ferrule distal end member 31 that has a small hole 33 inside and a ferrule base portion 36 that contacts the end portion 35 on the side opposite to the contact end surface 32 of the ferrule distal end portion 31.

The ferrule distal end portion 31 is formed by a ceramic such as zirconia or the like or a hard material such as glass or the like, and has a substantially cylindrical shape. The outer peripheral surface 31a of the ferrule distal end member 31 is a cylindrical surface. The material for the ferrule distal end member 31 is one that is harder than the material of the ferrule base portion 36.

The central axis of the small hole 33 is precisely positioned with respect to the outer peripheral surface 31a of the ferrule distal end member 31. Thereby, as is well-known, when the optical connector plug is inserted into an optical connector adaptor or an optical connector receptacle (not illustrated) and the end surfaces of the optical fibers are abutted together, the split sleeves of the optical connector adaptor or optical connector receptacle are mounted on the outer periphery of the ferrule 3. Thereby, it is possible to precisely position, align, and optically connect the optical fibers housed together in the ferrule.

The connecting end surface 32 of the ferrule distal end member 31 may be polished after the first optical fiber 34 is inserted into the small hole 33. The first optical fiber 34 has a portion 34a that is housed in the ferrule 3 and a portion 34b that projects from the back end of the ferrule 3.

The ferrule base portion 36 is a portion that is interposed between the ferrule distal end member 31 and the flange 37, and the outer peripheral surface thereof has a substantially cylindrical shape. The diameter (outer diameter) of the ferrule base portion 36 is slightly smaller than the diameter (outer diameter) of the ferrule distal end member 31. That is, the shape of the outer periphery of the ferrule base portion 36 is slightly smaller than the outer peripheral shape of the ferrule distal end member 31.

Thus, even when the precision of the dimensions of the ferrule base member 36 are slightly little low, the projecting of this outer peripheral surface from the outer peripheral surface 31a of the ferrule distal end member 31 can be avoided, and when the split sleeve is mounted on the ferrule distal end member 31, the outer peripheral surface of the ferrule base portion 36 interfering with the split sleeve can be suppressed. Therefore, it is possible to carry out the alignment of the optical fiber 34 with high precision.

As shown in FIG. 19 to FIG. 21, the housing 202 is structured by a housing body 210 that has a clamping portion accommodating portion 215 that accommodates the clamping portion 4, and a spring press 20 that is installed on the back end side of the clamping portion accommodating portion 215 of the housing body 210.

The housing body 210 is formed in a sleeve-shape so as to pass through front to back from the opening 211 to opening 215b. A constricted portion 212 at which the inner cross-section is reduced is formed inside the housing body 210. The constricted portion 212 restricts the clamping portion equipped ferrule 30 from being extracted from the opening portion 211 on the distal end side the housing body 210 by abutting the flange 37 of the clamping portion equipped ferrule 30.

A groove shaped rail (guiding groove) 16 that guides the sliding portion 17 (described below) so as to slide freely is formed on one side portion (the lower side in FIG. 19) of the housing body 210. The rail 16 is provided in the space from the back end 213 of the housing body 210 to the abutting portion 16a. The abutting portion 16a functions as a stopper so that the sliding portion 17 does not move any further to the distal end side of the housing body 210 by one end 17a of the sliding portion 17 abutting the abutting portion 16a.

The sliding portion 17 is a long and narrow plate, and has a long hole 17c that extends in the longitudinal direction. The long hole 17c has a constricted portion 17d on the side of one end 17a of the sliding portion 17 disposed on the front end side of the connector body 201. The cross-section of the sliding portion 17 is formed such that the side facing the clamping portion accommodating portion 215 of the housing body 210 (the upper surface in FIG. 27) is curved.

The clamping portion accommodating portion 215 is a portion between the constricted portion 212 and the opening 215a in the housing body 210, and has an inner space 215a that accommodates the clamping portion 4 therein. In the housing body 210, the ferrule 3 projects from the constricted portion 212 towards the opening portion 211 by inserting the clamping portion equipped ferrule 30 from the opening 215b, and at the same time, the clamping portion 4 can be accommodated in the clamping portion accommodating portion 215.

As shown in FIG. 20 and FIG. 22, the spring press 20 includes a boss portion 221 which is mounted in the opening 215b of the back end side (the clamping portion accommodating portion 215 side) of the housing body 210; a pair of pivots 222 and 222 that pivot to enable the protecting portion 206 (described below in detail) to rotate; a slide groove 223 in which the sliding portion 17 is engaged so as to be able to slide; an optical fiber insertion hole 224 through which the optical fiber at the distal end of the optical fiber cable F passes; and a pressure receiving portion 225 that receives the elastic force from the spring 228 that urges the clamping portion equipped ferrule 30.

The boss portion 221 projects towards the distal end side where the spring press 20 moves towards the housing body 210, and has a cylindrical shape with a space (spring accommodating space) 226 that accommodates the spring 228 therein. Ribs 221a are provided on the external periphery of the boss portion 221 for engaging the housing body 210. The ribs 221a are engaged in outer peripheral grooves (not illustrated) formed in the inner surface of the back end of the clamping portion accommodating portion 215, and thereby the spring press 20 is firmly held so as not to be extracted from the housing body 210.

As shown in FIG. 20, the pressure receiving portion 25 is formed on the bottom portion of the spring accommodating space 226, and while the spring press 20 is engaged with the housing body 210, faces the back end portion 47 of the clamping portion 4. The spring 228 is disposed so as to be interposed between the pressure receiving portion 225 of the spring press 20 and the back end portion 47 (pressure receiving portion) of the clamping portion 4. The spring 228 urges the clamping portion equipped ferrule 30 in the direction of the distal end of the connector body 201 (the left side in FIG. 19) when a pressing force is applied to the connecting end surface 32 of the ferrule 3 from the other connector ferrule or the like, and the pressing force is applied between the ferrules.

As shown in FIG. 22, the pivots 222 are short cylindrical projections, and are provided so as to oppose each other on the outer surface of the side portion of the spring press 20.

The slide groove 223 is disposed so as to communicate with the rail 16 of the housing body 210 when the spring press 20 is fastened to the housing body 210. The distal ends of the slide groove 223 on both sides form curved walls 223a and 223a that curve inward. The sliding portion 17 is engaged between the curved walls 223a and 223a, and thereby the sliding portion does not separate in a direction (here, the lower side in FIG. 19) that differs from the sliding direction of the sliding portion 17. In addition, a convex portion 223a that can engage the constricted portion 17d of the long hole 17c of the sliding portion 17 is provided on the slide groove 223. The sliding portion 17 is fastened firmly to the sliding press 20 due to the constricted portion 17d engaging the convex portion 223b, and as shown in FIG. 20, and the sliding portion 17 can be maintained in a configuration projecting far out from the back end side of the connector body 1.

The optical fiber insertion hole 224 passes through the pressure receiving portion 225 and the back end surface 27 side of the spring press 20, and communicates with the opening 215b of the clamping portion accommodating portion 215 while the spring press 20 engages the housing body 210. As shown in FIG. 19, the optical fiber insertion hole 224 is a tapered hole that is tapers from the back end surface 27 towards the tapered hole 45b of the clamping portion 4. Because the optical fiber insertion hole 224 faces the back end of the connector body 201, and the optical fiber insertion hole 224 is a tapered hole as described above, the insertion of the optical fiber into the clamping portion 4 becomes easy.

As shown in FIG. 23 and FIG. 24, the protecting portion 206 is formed so as to have a substantially U-shape in cross-section by a pair of mutually opposing side walls 261 and 262 and a bridging wall 261 that bridges these side walls 262 and 262. Pivot holes 264 that can engage the pivots 222 of the connector body 1 are provided on one end side of each of the side walls 262, and engaging holes 265 that can engage the engaging projections 256 that project on both sides of the anchoring fixture 205 are formed on the other end side of each of the side walls 262 opposite to this end side.

As shown in FIG. 20, a pressing projection 266 projects on the inner surface side of the bridging walls 261, and the pressing projection 266 advances into the anchoring groove 253 and presses the outer cover F3 from the side of the protecting portion 206 when the protecting portion 206 covers the anchoring groove 253.

As shown in FIG. 20, FIG. 25, and FIG. 26, the anchoring fixture 205 includes a bottom wall portion 251; a pair of side wall portions 252 and 252 that are provided so as to oppose each other on both side edges of the bottom wall portion 251; and a pair of curved walls 259 and 259 that are provided on the side (the bottom side in FIG. 25) opposite to the side wall portions 252 of the bottom wall portion 251.

As shown in FIG. 25 and FIG. 26, a pair of engaging projections 256 and 256 that can engage with the engaging holes 265 (described below) formed in the protecting portion 206 project on both side portions of the anchoring fixture 205.

An anchoring groove 253 having a U-shape in cross-section (opening upward in FIG. 25) is formed between side wall portions 252 and 252. The opening portion that opens in this U-shaped anchoring groove 253 serves as the insertion opening 254 for inserting the optical fiber cable F into the anchoring groove 253.

Bead-shaped projections 253a, which hold the optical fiber cable F by compressing the outer cover F3 of the optical fiber cable F, project in plurality on both sides of the inner surface of the anchoring groove 253. Thereby, by fitting a portion of the optical fiber cable F that is covered by the outer cover F3 into the anchoring groove 253, it is possible accommodate and fasten the optical fiber cable F in the anchoring groove 253. Preferably, the resistance to extraction of the optical fiber cable F due to the compression by the projections 253a is equal to or greater than 5 kgf.

The anchoring groove 253 has a front end wall 257 that projects beyond both side wall portions 252a on the distal end side (the left side in FIG. 20 and FIG. 26) of the anchoring fixture 205, which is the side facing the connector body 201 when the pressed towards the connector body 201. The side end wall 257 has a notch shaped gap 257a on the center portion of the anchoring groove 253 in the transverse direction (the direction orthogonal to the direction of the extension of the anchoring groove 253; the vertical direction in FIG. 26). The amount of the opening of the gap 257a of the front side wall 257 is sufficiently large to allow the insertion of the coated optical fiber F2, but not allow the insertion of the outer cover F3 of optical fiber cable F. When the optical fiber cable F is anchored in the anchoring groove 253, the end part of the outer cover F3 is prevented from projecting out to the distal end side of the anchoring fixture 205 by the side end wall 257.

A groove-shaped engaging portion (engaging groove) 258 that opens on the side opposite to the anchoring groove 253 (downward in FIG. 25) is formed between the curved walls 259 and 259. The sliding portion 17 can engage the curved walls 259 and 259 and the anchoring groove 258. The engaging groove 258 is provided in the space from the front end side of the anchoring fixture 205 to an abutting portion 258a. The abutting portion 258a is the abutting portion of the engaging groove 258 orthogonal to the longitudinal direction thereof. When the sliding portion 17 is engaged in the engaging groove 258 and the anchoring fixture 205 is pressed towards the connector body 201, the abutting portion 258a abuts the end 17b of the sliding portion 17 projecting from the connector body 201, and thereby the sliding portion 17 is pressed along the rail 16 of the connector body 201. The anchoring fixture 205 engages the sliding portion 17 through the engaging portion 258, and thereby unfavorable phenomenon such as unstableness of the anchoring fixture 205 or separation of the anchoring fixture 205 from the sliding portion 17 when the anchoring fixture 205 is pulled back can be prevented.

Next, an example of the procedure for attaching the optical connector A of the present embodiment to the distal end portion of the optical fiber cable F will be explained.

First, the coated optical fiber F2 is exposed by removing the outer cover F3 on the distal end portion of the optical fiber cable F, and then the bare optical fiber F1 is exposed by removing the resin coat on the distal end portion of the coated optical fiber F2. The lengths of the bare optical fiber F1 and the coated optical fiber F2 are adjusted such that, in the clamping portion 4, the bare optical fiber F1 is accommodated in the positioning groove 44 and the distal end portion of the coated optical fiber F2 is accommodated in the outer cover accommodating groove 45a, and the end surfaces of the portion 34b of the first optical fiber 34 projecting from the back end of the ferrule 3 and the bare optical fiber F1 are abutted at a suitable pressing force. In particular, the lengths of the bare optical fiber F1 and the coated optical fiber F2 are adjusted so that the coated optical fiber F2 is bent (refer to FIG. 21) when one end 17a of the sliding portion 17 abuts the abutting portion 16a.

The outer cover F3 of the optical fiber cable F is fit into the anchoring groove 253 of the anchoring fixture 205, and thereby the optical fiber cable F is installed in the anchoring fixture 205. At this time, the coated optical fiber F2 is inserted into the notch 57a of the front end wall 257 of the anchoring fixture 205.

Note that in the optical connector of the present embodiment, because there is no projection more forward than this front end wall 257 present on the anchoring fixture 205, a procedure is possible in which the optical fiber cable F is mounted in the anchoring fixture 205 after removing the outer cover F3 on the distal end portion of the optical fiber cable F and exposing the coated optical fiber F2, and subsequently, exposure of the bare optical fiber F1 (removing the resin coat of the coated optical fiber F2) and the adjustment (cutting or the like) of the lengths of the bare optical fiber F1 and the coated optical fiber F2 can be carried out. In this case, the projection length of the coated optical fiber F2 and the bare optical fiber F1 from the front end wall 257 is easily and accurately adjusted on the basis of the front end wall 257. Therefore, even when the end portion of the outer cover F3 of the optical fiber cable F is unevenly formed, the lengths of the coated optical fiber F2 and the bare optical fiber F1 can be easily and reliably adjusted.

A wedge (not illustrated) has been inserted between the base body 41 and the lid bodies 42 and 43 in the clamping portion 4 of the connector body 201, and a space between the base body 41 and the lid portions 42 and 43 has been pressed open. Then, the protecting portion (connecting portion) 206 is raised so as to be orthogonal to the connector body 201 and disposed at the retracted position 6B. When the protecting portion 206 is in the retracted position 6B, the motion of the anchoring fixture 205 is not hindered by the protecting portion 206 when the anchoring fixture 205 is pressed towards the connector body 201 and abuts the sliding portion 17.

As shown in FIG. 20 and FIG. 28, while the optical fiber cable F is anchored in the anchoring groove 253, the abutting portion 258a of the anchoring fixture 205 is pushed to abut the other end 17b of the sliding portion 17 that projects from the back end of the connector body 201. By pressing the anchoring fixture 205, the sliding portion 17 slides along the rail 16, and the anchoring fixture 205 is guided by the sliding on the sliding portion 17 along the rail 16. As a result, the bare optical fiber F1 of the optical fiber cable F is positioned with respect to the first optical fiber 34 inside the clamping portion 4, and the bare optical fiber F1 can be correctly inserted from the optical fiber insertion hole 224 into the positioning groove 44 of the clamping portion 4. Then, the bare optical fiber F1 inside the clamping portion 4 abuts the portion 34b of the first optical fiber 34 projecting from the back end of the ferrule 3, and the first optical fiber 34 and the optical fiber cable F are optically connected.

As shown in FIG. 21, the anchoring fixture 205 is pressed until one end 17a of the sliding portion 17 abuts the abutting portion 16a at the end of the rail 16, and thereby the first optical fiber 34 and the bare optical fiber F1 are abutted in the clamping portion 4 and the coated optical fiber F2 bends. As a result, due to the elasticity of the coated optical fiber F2, it is possible to ensure the abutting force between the end surfaces of the optical fibers 34 and F.

After the optical connection between the optical fibers 34 and F has been confirmed, the wedge (not illustrated) is removed and the space between the base body 41 and the lid bodies 42 and 43 is closed. Thus, due to the clamping force of the clamping portion 4 (specifically, the spring member 46), the optical fibers 34b and F1 are clamped and held between the elements 41, 42, and 43 in a state in which the end surfaces of the optical fibers 34b and F1 are abutted together, and thereby the optical connection between both of the optical fibers 34 and F is maintained.

As shown in FIG. 19, the bending of the coated optical fiber F2 is relieved by retracting the anchoring fixture 205, the protecting portion 206 is moved to the connecting position 6A from the retracted position 6B, and the anchoring fixture 205 is covered from the insertion opening 254 side of the anchoring groove 253. The engaging hole 265 of the protecting portion 206 engages the engaging projection 256 of the anchoring fixture 205, and thereby the anchoring fixture 205 is connected to the connector body 201. Then, the outer cover F3 of the optical fiber cable F is interposed and fastened between the bottom wall portion 251 of the anchoring fixture 205 and the pressing projection 266 of the protecting portion 206.

In the optical connector D of the present embodiment, the sliding portion 17 projects from the back end portion of the connector body 201, and thereby it is possible for the sliding portion 17 guides the anchoring fixture 205 in the direction in which the anchoring fixture 205 is pressed into the connector body 201. Thereby, it is possible to avoid damage that may occur due to the back surface of the bare optical fiber F1 abutting the back end surface 27 of the spring press 20 when the anchoring fixture 205 is pressed into the connector body 201.

By covering the anchoring groove 253 with the protecting portion 206, it is possible to prevent separation of the optical fiber cable F from the anchoring groove 253. Thereby, the handling of the optical fiber cable F during the attachment to the optical connector D becomes easy, and the optical fiber cable F and the first optical fiber 34 can be reliably optically connected by a simple operation.

Note that the present invention is not limited to the preferred embodiments, and alterations are possible that do not depart from the gist of the present invention.

In the embodiments described above, a case in which the optical connector has a cylindrical shaped ferrule was explained, but this is not limiting. For example, an optical connector having a substantially rectangular shaped ferrule can be used.

As long as the structure of the clamping portion is one in which the optical fibers are aligned and the abutment connection between the end surfaces is clamped and held, the structure and shape are not particularly limited. For example, the number of lid bodies opposite to the base body of the elements may be one or plural.

Although not necessary in the invention disclosed in the embodiments described above, the protecting portion that prevents separation of the optical fiber from the anchoring groove should outer cover the insertion opening of the anchoring groove while the anchoring fixture and the connector body are connected. In the embodiment described above, structures were illustrated in which both the connector body and the anchoring fixture are separate (for example, a ring) and in which the protecting portion and the anchoring fixture are integral (for example, a lid). However, in addition, there is no limitation to structures in which, for example, the protecting portion is integral with the connector body (for example, a structure that projects from the connector body).

The present invention can be applied to an optical connector in which the optical fiber holes are formed in plurality in a ferrule, and connection optical fibers (first optical fibers) are housed in each of the optical fiber holes. In this case, if the number of alignment structures such as positioning grooves provided on the clamping portion is at least the same as the number of connection optical fibers, each of the optical fibers terminated so as to be optically connectable by the optical connector can be optically connected with the connection optical fibers by the aligning mechanism. An example of this type of optical connector is the MT-type optical connector ferrule (MR: mechanically transferable) having a ferrule stipulated in JIS C 5981 or the like.

The present invention can be used in order, for example, to attach an optical connector to the distal end portion of an optical drop cable or an optical indoor cable at an operation site during the connection operation in which an optical fiber network is constructed.

What is claimed is:
1. An optical connector comprising:
 a connector body having a first optical fiber housed in advance in a ferrule so as to project from a back end of the ferrule that is opposite to the connection end surface; and
 an anchoring fixture that has an anchoring groove that anchors a second optical fiber that is to be optically connected to a portion of the first optical fiber that projects from the back end of the ferrule, and is releasably connectable to the connector body, wherein
 the anchoring fixture accommodates the second optical fiber in the anchoring groove by fitting a portion of the second optical fiber that is covered by an outer cover into the insertion opening of the anchoring groove, and the anchoring fixture and the connector body are connected by pressing the anchoring fixture into the connector body while the second optical fiber is anchored in the anchoring fixture to optically connect the first optical fiber and the second optical fiber, and
 a connecting portion that connects the anchoring fixture and the connector body forms a movable connecting portion that is adapted to vary the direction of the anchoring fixture with respect to the connector body while the both are connected.

2. The optical connector according to claim 1, wherein the movable connecting portion is formed by connecting a spherical portion formed on the connecting portion that projects on a back end side of the connector body and an engaging portion that is provided in the connecting portion that projects on a distal end side of the anchoring fixture and is engageable with the spherical portion.

3. The optical connector according to claim 1, wherein in the movable connecting portion, a pivot axis is formed by connecting an axle provided on the connecting portion that projects on a back end side of the connector body and a bearing that is provided on the anchoring fixture and is engageable with the axle.

4. The optical connector according to claim 3, wherein the second optical fiber is flat in cross-section, and the movable connecting portion is provided such that a direction of rotation around the pivot axis is in a direction of thickness of the second optical fiber while the second optical fiber is anchored in the anchoring groove.

5. An optical connector comprising:
 a connector body that has a first optical fiber that is housed in advance in a ferrule so as to project from a back end of the ferrule opposite the connecting end surface; and
 an anchoring fixture that has an anchoring groove that anchors a second optical fiber that is to be optically connected to portion of the first optical fiber that projects from the back end of the ferrule, and is releasably connectable to the connector body, wherein
 an anchoring fixture accommodates the second optical fiber in the anchoring groove by fitting a portion of the second optical fiber that is covered by an outer cover into an insertion opening of the anchoring groove, and the anchoring fixture and the connector body are connected while the second optical fiber is anchored in the anchoring fixture to optically connect the first optical fiber and the second optical fiber, and
 a protecting portion prevents separation of the second optical fiber from the anchoring groove by closing the insertion opening of the anchoring groove while the anchoring fixture and the connector body are connected.

6. The optical connector according to claim 5, wherein, on a distal end side of the anchoring fixture, which is a side facing the connector body when installed on the connector body, the anchoring groove is provided with a wall portion that prevents the end portion of the outer cover of the second optical fiber from projecting to the distal end side of the anchoring fixture, and a notch, through which a portion of the second optical fiber that has had the outer cover removed passes, is formed in the wall portion.

7. The optical connector according to claim 5, wherein a clamping portion that is provided at the back end of the ferrule that houses the first optical fiber in advance facing the connecting end surface of the ferrule clamps and holds the abutted and connected state between a portion of the first optical fiber that projects from the back end of the ferrule and the second optical fiber, a distal end portion of the second optical fiber is inserted into the clamping portion by connecting the anchoring fixture to the connector body while the second optical fiber is anchored in the anchoring groove and the first optical fiber and the second optical fiber are abutted and connected inside the clamping portion.

8. The optical connector according to claim 7, wherein the anchoring groove is provided at a position where a direction of the anchoring groove differs from the direction of the extension of the second optical fiber in the clamping portion, and a space is guaranteed that allows the second optical fiber to bend between the clamping portion and the anchoring groove while the first optical fiber and the second optical fiber are abutted and connected in the clamping portion.

9. The optical connector according to claim 8, wherein the direction of the anchoring groove with respect to the connector body varies in a plurality of directions.

10. The optical connector according to claim 5, wherein the protecting portion is formed by a lid that is freely openable and closeable and integrally formed with the anchoring fixture, a pair of connecting portions are provided on a back end side of the connector body that connect the anchoring fixture to the connector body by sandwiching the anchoring fixture having the lid being closed from a lid side and an anchoring fixture side.

11. An optical connector comprising:
a connector body having a first optical fiber housed in advance in a ferrule so as to project from a back end of the ferrule opposite to the connection end surface; and
an anchoring fixture that has an anchoring groove that anchors a second optical fiber that is to be optically connected to a portion of the first optical fiber that projects from the back end of the ferrule and is releasably connectable to the connector body, wherein
the anchoring fixture accommodates the second optical fiber in the anchoring groove by fitting a portion of the second optical fiber that is covered by an outer cover into an insertion opening of the anchoring groove, and the anchoring fixture is connected to the connector body while the second optical fiber is anchored in the anchoring fixture to optically connect the first optical fiber and the second optical fiber, a sliding portion is provided on the connector body in a slidable manner with respect to the connector body, an amount of projection of the sliding portion from the back end portion of the connector body along the insertion direction of the second optical fiber being variable, and
the second optical fiber is positioned with respect to, abutted against, and connected to the first optical fiber by pressing the sliding portion towards the connector body while abutting an abutting portion of the anchoring fixture against the sliding portion.

12. The optical connector according to claim 11, wherein the connector body has an abutting portion on the sliding portion that abuts in an insertion direction of the second optical fiber.

13. The optical connector according to claim 11, wherein the connector body has a connecting portion that is disposed at a retracted position that does not interfere with the movement of the anchoring fixture when the anchoring fixture abuts the sliding portion and is pressed towards the connector body, and is moveable to a connecting position that enables connection with the anchoring fixture by moving from a retracted position after the second optical fiber is abutted and connected to the first optical fiber.

14. The optical connector according to claim 11, wherein the sliding portion has a long plate shape, and a groove-shaped rail is provided on the connector body that slidably guides the sliding portion along the longitudinal direction thereof.

15. The optical connector according to claim 14, wherein the anchoring fixture has a groove-shaped engaging portion that is engageable with an end of the sliding portion that project from the connector body and that is opposite to the other end of the sliding portion that is inserted into the groove-shaped rail of the connector body.

* * * * *